(12) United States Patent
Huang et al.

(10) Patent No.: US 10,755,706 B2
(45) Date of Patent: Aug. 25, 2020

(54) VOICE-BASED USER INTERFACE WITH DYNAMICALLY SWITCHABLE ENDPOINTS

(71) Applicant: MIDEA GROUP CO., LTD., Foshan (CN)

(72) Inventors: Haibin Huang, San Jose, CA (US); Chi Zhang, San Jose, CA (US); Xiaofeng Xu, Foshan (CN); Chen Zhang, San Jose, CA (US); Dongyan Wang, San Jose, CA (US)

(73) Assignee: MIDEA GROUP CO., LTD., Foshan (CN)

( * ) Notice: Subject to any disclaimer, the term of this patent is extended or adjusted under 35 U.S.C. 154(b) by 247 days.

(21) Appl. No.: 15/936,109

(22) Filed: Mar. 26, 2018

(65) Prior Publication Data

US 2019/0295542 A1    Sep. 26, 2019

(51) Int. Cl.
| | |
|---|---|
| *G10L 15/00* | (2013.01) |
| *G10L 15/22* | (2006.01) |
| *G10L 15/18* | (2013.01) |
| *G10L 15/30* | (2013.01) |
| *H04L 12/28* | (2006.01) |

(52) U.S. Cl.
CPC .......... *G10L 15/22* (2013.01); *G10L 15/1815* (2013.01); *G10L 15/30* (2013.01); *G10L 2015/223* (2013.01); *H04L 12/2803* (2013.01)

(58) Field of Classification Search
CPC .................................................... G10L 15/00
USPC ....... 704/257, 254, 275, 500, 4, 9; 705/7.13; 455/434
See application file for complete search history.

(56) References Cited

U.S. PATENT DOCUMENTS

| | | | |
|---|---|---|---|
| 10,073,426 B1* | 9/2018 | Davis, II | ................ G06N 5/025 |
| 2002/0138338 A1* | 9/2002 | Trauth | ............. G06Q 10/06311 |
| | | | 705/7.13 |

(Continued)

FOREIGN PATENT DOCUMENTS

| | | |
|---|---|---|
| CN | 105206275 A | 12/2015 |
| CN | 105242556 A | 1/2016 |

(Continued)

OTHER PUBLICATIONS

Midea Group Co. Ltd, International Search Report and Written Opinion, PCT/CN2018/117290, dated Jan. 30, 2019, 7 pgs.

*Primary Examiner* — Michael Colucci
(74) *Attorney, Agent, or Firm* — Morgan, Lewis & Bockius LLP

(57) ABSTRACT

A method and system of controlling a digital assistant with dynamically switchable endpoint devices, comprising: dynamically selecting a respective input endpoint device and a respective controlled device for each of a plurality of voice-based requests from a user to the computing system, including: at a first point in time, acquiring respective instances of a first voice input from a first set of two or more input endpoint devices; obtaining a representative copy of the first voice input based on the respective instances of the first voice input that have been acquired from the first set of two or more input endpoint devices; determining a first actionable intent based on the representative copy of the first voice input; and dispatching a first encoded instruction to a first controlled endpoint device selected from the plurality of controlled endpoint devices in accordance with the first actionable intent.

20 Claims, 11 Drawing Sheets

(56) References Cited

U.S. PATENT DOCUMENTS

| | | | |
|---|---|---|---|
| 2015/0170664 A1* | 6/2015 | Doherty | G08C 17/02 |
| | | | 704/275 |
| 2015/0195671 A1* | 7/2015 | Seed | H04W 4/70 |
| | | | 455/434 |
| 2016/0104480 A1* | 4/2016 | Sharifi | G10L 15/285 |
| | | | 704/254 |
| 2016/0210832 A1* | 7/2016 | Williams | G08B 13/24 |
| 2017/0025124 A1* | 1/2017 | Mixter | G10L 15/22 |
| 2017/0154629 A1* | 6/2017 | Lu | G10L 15/22 |
| 2018/0348718 A1* | 12/2018 | Richardson | G08B 21/22 |

FOREIGN PATENT DOCUMENTS

| | | |
|---|---|---|
| CN | 106653008 A | 5/2017 |
| WO | WO 2017173566 A1 | 10/2017 |

\* cited by examiner

VOICE-BASED USER INTERFACE WITH DYNAMICALLY SWITCHABLE ENDPOINTS

TECHNICAL FIELD

This disclosure relates generally to voice-based user interfaces, and more specifically, to a method and system for controlling devices using a voice-based interface that has dynamically switchable endpoints (e.g., input devices, output devices, and/or controlled devices).

BACKGROUND

Recently, voice-based digital assistants, such as Apple's SIRI, Amazon's Echo, Google's Google Assistant, and Microsoft's Cortana, have been introduced into the marketplace to handle various tasks such as home appliance controls, web search, calendaring, reminders, etc. One advantage of such voice-based digital assistants is that users can interact with a device in a hands-free manner without handling or even looking at the device. Conventionally, to initiate the voice-based assistant, users can press a button or select an icon on a touch screen on a central control device (e.g., a smartphone, or a central communication hub), or speak a trigger phase (e.g., a predefined wake-up word or command) to the central control device. The voice-based digital assistant interprets the voice command it receives after it has been activated, and performs an action (e.g., providing an informational answer and/or sending an encoded instruction to control a peripheral device, such as an appliance in a smart home environment).

Controlling multiple devices using a voice-based user interface on a central control device pose many limitations. For example, the user must be within reach of the central control device at all times in order to activate the digital assistant (e.g., by pressing a button on the central control device or speaking the wake-up word to the central control device). The central control device is expensive, and it is difficult and costly to manufacture and maintain. Even when multiple central control devices are used, their actions are independent of one another and may conflict with one another.

Thus, it would be beneficial to provide a way to improve the way that multiple devices are controlled by a digital assistant using a voice-based user interface.

SUMMARY

Accordingly, there is a need for a method to control multiple devices (e.g., home appliances and other devices) using a digital assistant via a voice-based user interface.

The embodiments described below provide systems and methods for controlling multiple devices through a voice-based user interface with dynamically switchable endpoints (e.g., input endpoint devices, output endpoint devices, and/or controlled endpoint devices), and in general, systems and methods for controlling a digital assistant with dynamically switchable endpoint devices.

In some embodiments, a method of controlling a digital assistant with dynamically switchable endpoint devices, comprising: at a computing system having one or more processors and memory: registering a plurality of input endpoint devices and a plurality of controlled endpoint devices, wherein each of the plurality of input endpoint devices has a respective audio input interface and is configured to transmit a captured voice input to the computing system over a network, and wherein each of the plurality of controlled endpoint devices is configured to perform a requested task in accordance with a corresponding instruction received from the computing system over the network; and dynamically selecting a respective input endpoint device and a respective controlled device for each of a plurality of voice-based requests from a user to the computing system, including: at a first point in time, acquiring respective instances of a first voice input from a first set of two or more input endpoint devices among the plurality of input endpoint devices; obtaining a representative copy of the first voice input based on the respective instances of the first voice input that have been acquired from the first set of two or more input endpoint devices among the plurality of input endpoint devices; determining a first actionable intent based on the representative copy of the first voice input; and dispatching a first encoded instruction to a first controlled endpoint device selected from the plurality of controlled endpoint devices in accordance with the first actionable intent.

In some embodiments, the method further includes: registering a plurality of output endpoint devices, wherein each of the plurality of output endpoint devices has a respective audio output interface that is configured to output audio content received from the computing system over the network; and dynamically selecting a respective output endpoint device for each of the plurality of voice-based requests from the user to the computing system, including: dispatching a first audio output corresponding to the first actionable intent to a first output endpoint device selected from the plurality of output endpoint devices over the network, wherein the first output endpoint device outputs the first audio output.

In accordance with some embodiments, a computer-readable storage medium (e.g., a non-transitory computer readable storage medium) is provided, the computer-readable storage medium storing one or more programs for execution by one or more processors of an electronic device, the one or more programs including instructions for performing any of the methods described herein.

In accordance with some embodiments, an electronic device (e.g., a portable electronic device) is provided that comprises means for performing any of the methods described herein.

In accordance with some embodiments, an electronic device (e.g., a portable electronic device) is provided that comprises one or more processors and memory storing one or more programs for execution by the one or more processors, the one or more programs including instructions for performing any of the methods described herein.

In accordance with some embodiments, an information processing apparatus for use in an electronic device is provided, the information processing apparatus comprising means for performing any of the methods described herein.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

Like reference numerals refer to corresponding parts throughout the drawings.

DESCRIPTION OF EMBODIMENTS

Figure 1A:
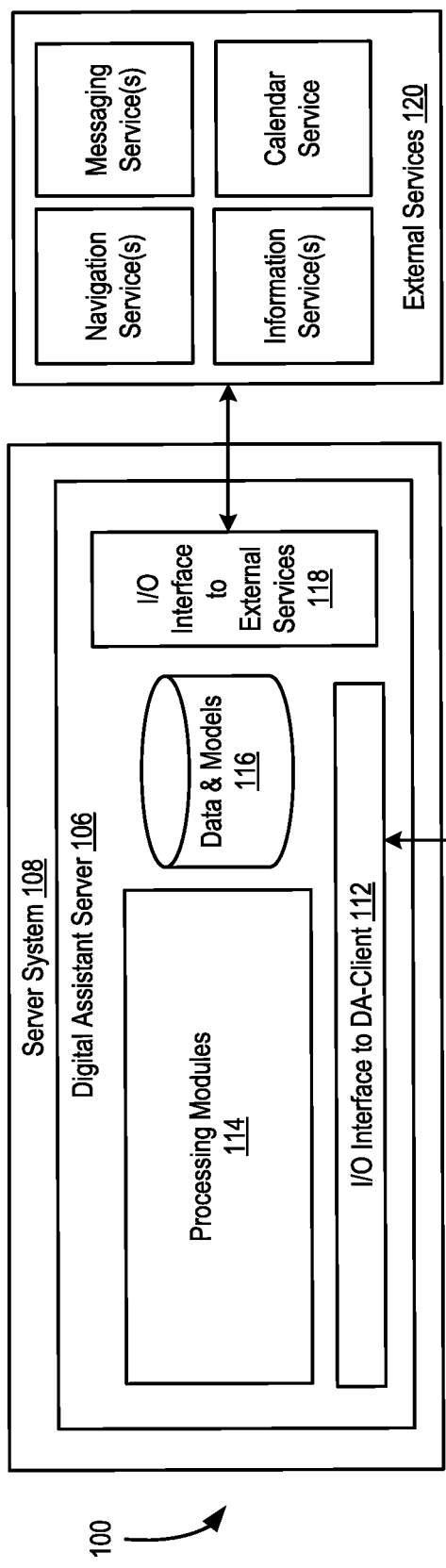
FIG. 1A is a block diagram illustrating a conventional configuration in which a digital assistant operates through a voice-based user interface provided by a central control device (e.g., a smartphone, tablet, or smart hub), and a voice-controlled device (e.g., a smart refrigerator) with its own independent voice-input interface.
Figure 1A:
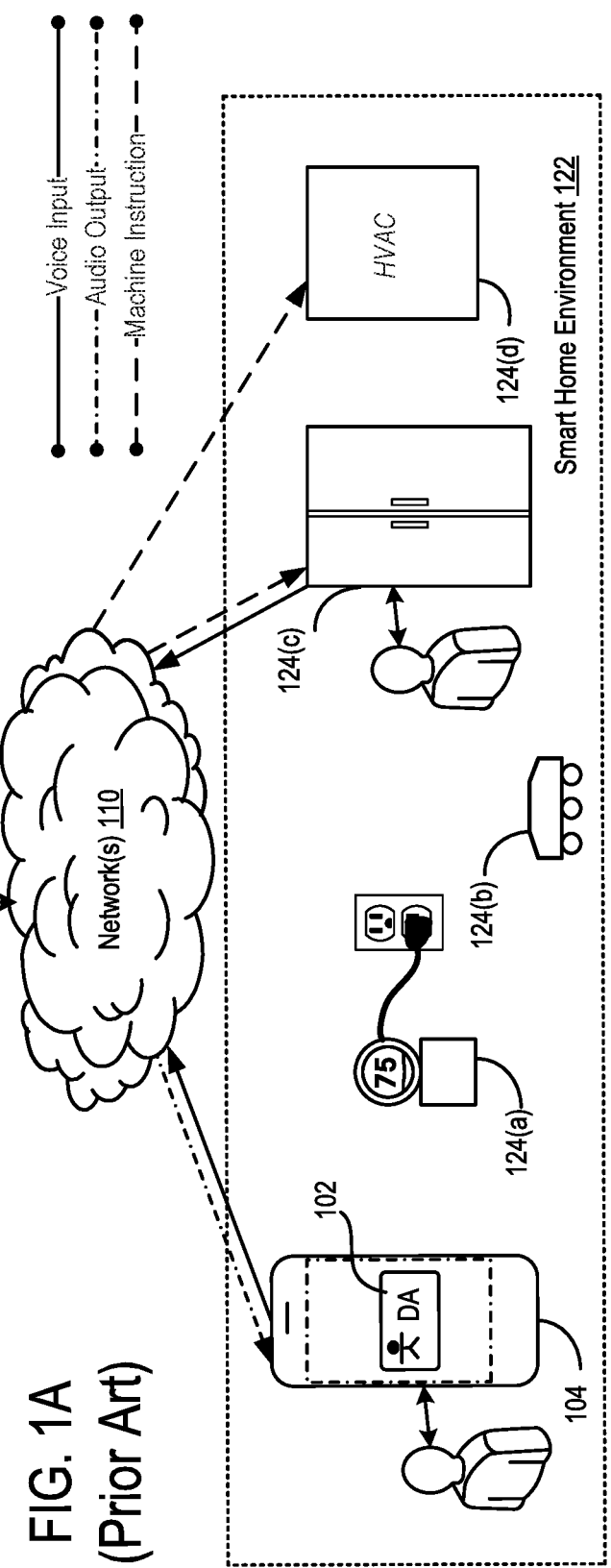

The embodiments described below provide systems and methods for controlling a digital assistant with dynamically switchable endpoint devices (e.g., including controlling multiple home devices with or without built-in audio input interfaces (e.g., including endpoint devices with built-in audio input interfaces, and endpoint devices without built-in audio input interfaces) through a digital assistant that dynamically switches input and output channels among multiple endpoint devices. In some embodiments, the systems and methods described herein are used in conjunction with or instead of a central control device, such as a smartphone, a tablet device, or a dedicated communication hub.

In some embodiments, a voice-based assistant is initiated using a voice trigger at an electronic device. Interactions with a voice-based digital assistant (or other speech-based services, such as a speech-to-text transcription service) often begin when a user utters a trigger phrase (e.g., "Hey, assistant.") or presses an affordance (e.g., a button or icon) on a control device (e.g., a smartphone, or central communication hub), in order to activate the digital assistant. Once the digital assistant is activated, e.g., as indicated by a light, a sound (e.g., a beep), or a vocalized output (e.g., "what can I do for you?"), the user can proceed to utter additional voice commands or queries to describe the task(s) that the user wishes the digital assistant to perform. The digital assistant processes the utterance and deduces the user's intent; and if the intent is recognized, the digital assistant performs the requested task, e.g., by outputting requested information and/or sending an instruction to control one or more functions of another device (e.g., home appliances, smart home devices, etc.).

A conventional digital assistant system utilizes a voice-based user interface enabled on a central control device (e.g., a smartphone, a tablet, or a central communication hub) to collect and transmit the user's voice commands and queries to the backend server, where the backend server processes the voice commands and queries, and returns requested information to the central control device or sends out instructions to control another device. One of the drawbacks of using a voice-based user interface that is only available on a central control device is that, being the sole audio input interface for the digital assistant, the central control device needs to be made relatively robust and stable, resulting higher manufacturing cost and maintenance cost, and lower adaptability, fewer product choices, and less flexibility.

One problem with using mobile smart devices as the sole audio input interface for the digital assistant is that, the voice input channel needs to remain open for extended period of time such that a voice trigger can be captured and recognized at any time. Keeping the voice input channel open poses an issue for mobile smart devices because their batteries are limited and drain quickly with such prolonged background operation of the voice input channel.

One problem with a central communication hub that is plugged into a power source is that the customer needs to stay within a small range of the central communication hub, in order for the user's voice trigger phrase or voice command to be clearly captured by the central communication hub. This limitation reduces the usefulness of the digital assistant in a large room and/or in a house with multiple rooms. It is also troublesome for a user to always having to drop whatever he/she is doing and move to the location of the central communication hub to instruct the digital assistant to perform a task. Furthermore, if the user wishes to control a device that is not in the same room as the central communication hub, the user may not be able to observe the current condition of the device that is to be controlled, and/or get visual confirmation that the desired function is properly performed on the controlled device. This restriction on the user's location at the time of using the digital assistant decreases the usage efficiency of the digital assistant and increases the chance of operation errors.

A conventional solution to the above problem might be to use multiple of the central communication hubs located at different locations in a house that are all connected to the same digital assistant. The problem with such a solution is higher cost for installing these central communication hubs, and possible interference and lack of coordination between these independent central communication hubs. For example, each of these independent central communication hubs may be woken up by the same utterance of the trigger phrase, if the volume of the user's utterance is sufficiently high and multiple central communication hubs are located relatively close to the user. As a result, the multiple communication hubs may all respond to the user's input, and produce duplicate audio outputs and instructions. Furthermore, the outputs from the different communication hubs may be captured by other communication hubs, creating a jumble of audio inputs and interfere with the capture and interpretation of the real user inputs. Furthermore, when audio input interfaces are provided on multiple independent smart devices and/or central communication hubs, the noise tolerance on these interfaces is also reduced because the echoes and resonances produced on these devices. Furthermore, when there are delays between the capture and processing of the same voice command on the multiple independent central control devices, multiple duplicate instructions may be sent to a controlled device, causing conflict and confusion at the controlled device. All of these problems set forth above limits that usage scenario of these central communication hubs to one hub per room, such that only one of these hubs transmits a voice input at a time.

Another issue with a conventional audio input interface provided by a central control device is that, this type of central control device often restricts the types and brands of products that are compatible with the central control device. For example, a vender of a particular brand of central control device may only allow certain brands and models of appliances devices or smart home devices to be controlled over the audio input interface provided on the central control device. This restriction means that the applicability of the voice-based digital assistant is reduced. In addition, some legacy appliances will be left out and will not be controllable through the voice-based digital assistant.

In addition to a voice-based digital assistant that can control a wide variety of devices through the network, there are also standalone voice-controlled devices. These standalone voice-controlled devices are capable of capturing a voice input from a user directly (e.g., spoken directly to the built-in microphone on the standalone voice-controlled device), recognize valid voice commands (e.g., based on local voice recognition capabilities, or through direct communication with a remote server), and perform a limited set of functions in accordance with the recognized valid voice commands. These standalone voice-controlled devices do not capture and process voice input directed to other devices. In many cases, these standalone voice-controlled devices need to be activated specifically (e.g., by the user turning on or pressing on a command button on the device itself). There may be multiple of these standalone voice-controlled devices in a house. They are independent of one another. They may be woken up all at the same time by the same trigger phrase uttered by the user, and may treat a subsequently uttered voice command as a command directed to itself, even if the user's voice command was intended for only one of the devices. In addition, while multiple of these devices are activated at the same time (e.g., sometimes, unintentionally by the user), the voice exchanged between the user and one of the devices may be captured by one or more other devices and create unintended responses from the other devices. Furthermore, the audio input interfaces and voice command processing capabilities on these multiple standalone voice-controlled devices are dormant most of the time when the devices are not in use, resulting in underutilization of the hardware and computing power available on the standalone voice-controlled devices.

As described above, conventional methods of using a wake-up word or phrase to activate a voice-controlled digital assistant and/or standalone voice-controlled device may result in confusion and interference between multiple devices all responding to the same wake-up word. A conventional solution may require different devices to use different wake-up words. However, such a solution means that the user not only has to go through additional set up processes to set up the different wake-up words for the different devices, but also has to remember the different wake-up words for the different devices, making the devices difficult to manage and use.

As disclosed herein, a voice-based digital assistant is configured to have a multi-channel input collection interface that is capable of simultaneously receive instances of the same voice input (e.g., voice input captured and transmitted in multiple independent audio input streams) from a number of endpoint devices that have audio input interfaces and that are in the vicinity of the user at the time. The voice-based digital assistant dynamically selects a copy of the voice input received from only one of the number of the endpoint devices as the voice input that is to be processed by the speech-to-text processing and natural language processing modules to deduce the user's intent embodied in the voice input. The selection of the copy of the voice input for intent deduction is based on various qualities of the endpoint devices that captured and transmitted to the voice input to the digital assistant server and based on the qualities of the audio streams containing the voice input that have been received from the different endpoint devices. The voice-based digital assistant processes the selected audio stream containing the voice input, and the voice-based digital assistant selects, from among multiple endpoint devices, a destination device that is to output an audio output (e.g., a confirmation output, an informational answer, etc.) and/or perform a requested task. The endpoint devices that the voice-based digital assistant collects inputs from and dispatches outputs to, include, devices that have respective audio input interfaces and/or respective voice output interfaces, devices that do not have voice input/output interfaces but may be controlled remotely via commands received from the digital assistant over a network, and/or devices that have audio input interfaces and voice output interfaces, and are controllable remotely via commands received from the digital assistant over a network. Each device with a voice input interface (e.g., a microphone) can serve as an input endpoint for the voice-controlled digital assistant. Each device with an audio output interface (e.g., a speaker) can serve as an output endpoint for the voice-controlled digital assistant. A device that is controlled by the voice-based digital assistant does not need to have its own voice input interface or audio output interface. The role that a particular endpoint device performs when a voice command is uttered by a user is dynamically determined by the digital assistant, and dependent on the device's physical proximity to the user and the device's input/output capabilities.

The method and configuration of functions set forth herein address the issues and shortcomings of the conventional methods outline above, and offer at least some of the advantages set forth below. Other advantages will be apparent in light of the disclosure provided herein.

First of all, by utilizing all available audio input interfaces at a particular location (e.g., different devices with audio input interfaces distributed in different rooms of a house), the need and drawbacks of a central communication hub/control device or multiple independent central communication hubs/control devices are eliminated. The higher cost of purchasing the central communication hub for each room can be avoided. The task of processing user's voice inputs and deducing the user's intent is allocated to the cloud-side onto the server end of the digital assistant. Even if one central communication hub or control device can still be utilized in addition to other audio input endpoint devices, there is no need to put additional hubs or control devices in different rooms of the house to control devices in the different rooms. Each remotely-controllable device (e.g., voice-enabled home appliances and non-voice enabled devices) behaves as a slave from the centralized cloud account perspective. Each remotely controlled device (e.g., smart home appliances) can have a very simple voice input module that is low cost and low maintenance (e.g., no need for frequent software/firmware update at the device side). There is no special requirement on the processing power of the endpoint device, therefore, any brand and make of endpoint device may be integrated into the digital assistant system as an input endpoint device, and/or output endpoint device, regardless of whether the device is originally voice-enabled or not. It is noted that the input endpoint devices and output endpoint devices described here do not refer to microphones and speakers that are dedicated input and output devices for a smartphone or central communication hub (e.g., the multifunctional device that provides the digital assistant client-side), where the microphones and speakers do not directly communicates with the digital assistant server and do not perform functions other than being the input and/or output interfaces of the smartphone or central communication hub.

By utilizing the available audio input interfaces that are already available on existing voice-controlled devices in a house, there is no additional cost to be invested into retrofitting existing devices or purchasing new devices to expand the locations at which voice commands may be collected from the user.

In some embodiments, the voice-based digital assistant corresponds to a centralized account (e.g., the smart home account for a particular household) on the cloud-side. The voice-based digital assistant is flexibly configurable such that each endpoint device that is registered with the voice-based digital assistant can be registered as an input endpoint device that is capable of capturing voice inputs uttered nearby and transmitting the voice inputs to the voice-based digital assistant over a network, as an output endpoint device for receiving audio outputs from the digital assistant server (e.g., alert sound, music, or voice-based informational answers) and delivering them to the user via a speaker, and/or a controlled endpoint device that performs a requested task (e.g., adjusting the room temperature, turn on or off, etc.) in accordance with machine instructions received from the digital assistant over a network, based on its hardware capabilities. Each endpoint device is also defined in terms of their primary functions (e.g., functions other than being an input and output device for the digital assistant), and whether it can control other devices and/or be controlled by other devices. The voice-based digital assistant establishes the databases for all the input endpoint devices and output endpoint devices, and controlled endpoint devices, for a controlled household account, and dynamically determines which input channel and which output channel to use based on each particular control scenario that occurs in real-time.

As described herein, multiple endpoint devices may be present in proximity of one another, but they share a single backend digital assistant that only selects one of the input received from the multiple endpoint devices to process and deduce the user's intent, then only one of the endpoint devices is selected as the controlled device and/or the device to output a voice-based output. Thus, there is no cross-talk between the devices, and no interference between the actions and audio outputs of the multiple endpoint devices.

As described herein, in some embodiments, multiple endpoint devices may be present in proximity to one another, and may capture the same voice utterance of the user and send the recording of the voice utterance to the backend digital assistant server. The digital assistant server utilizes the audio streams containing the voice input received from multiple input channels to either select the best quality audio stream containing the voice input, or to perform comparison, enhancement, and/or integration of the different audio streams from the multiple input channels to obtain the best quality voice input. As a result, the robustness and clarity of the voice input is improved, especially in a noisy environment, when the audio input interfaces of the endpoint devices are not of high quality, and/or when the user is speaking from a location that is not particularly close to any of the multiple endpoint devices. In some embodiments, the spatial location information of the multiple endpoint devices is also utilized to better enhance the voice input received from the different voice input channels, further improving the voice input quality, without increasing equipment cost.

As set forth above, the conventional solution of utilizing multiple different wake-up words for multiple independently controlled voice-controllable devices and/or central communication hubs/control devices, is problematic in itself sometimes. In accordance with the methods and systems described herein, a single wake-up word can be used to trigger a common voice-based digital assistant on the cloud-side, and disambiguation of the user's intent and dispatching of commands to control a destination device is performed by the intelligence implemented on the cloud-side. Therefore, software upgrades only need to be applied on the server-side to accommodate additional functionalities and support additional types of devices.

Other advantages and benefits of the method and system described herein are apparent to a person skilled in the art in light of the disclosure provided herein.

FIG. 1A is a block diagram of an operating environment 100 of a digital assistant in accordance with a conventional configuration. The terms "home assistant", "digital assistant," "virtual assistant," "intelligent automated assistant," "voice-based digital assistant," "voice assistant", or "automatic digital assistant," refer to an information processing system that interprets natural language input in spoken and/or textual form to deduce user intent (e.g., identify a task type that corresponds to the natural language input), and performs actions based on the deduced user intent (e.g., perform a task corresponding to the identified task type). For example, to act on a deduced user intent, the system can perform one or more of the following: identifying a task flow with steps and parameters designed to accomplish the deduced user intent (e.g., identifying a task type), inputting specific requirements from the deduced user intent into the task flow, executing the task flow by invoking programs, methods, services, APIs, or the like (e.g., sending a request to a service provider or sending a machine command to a controlled device); and generating output responses to the user in an audible (e.g., speech) and/or visual form.

Specifically, once initiated, a digital assistant system is capable of accepting a user request at least partially in the form of a natural language command, request, statement, narrative, and/or inquiry. Typically, the user request seeks either an informational answer or performance of a task (e.g., by the home assistant system or a controlled device). A satisfactory response to the user request is generally either provision of the requested informational answer, performance of the requested task, or a combination of the two. For example, a user may ask the digital assistant system a question, such as "What is the temperature in the room right now?" Based on the user's current location, and the ambient temperature, the digital assistant may answer, "The room temperature is 80 degrees." The user may also request the performance of a task, for example, by stating, "Please turn on the air conditioner." In response, the home assistant may acknowledge the request by generating a voice output, "Yes, right away," and then proceed to turn on the air conditioner in the room through a predefined control API of the air conditioner. There are numerous other ways of interacting with a digital assistant to request information or performance of various tasks. In addition to providing verbal responses and taking programmed actions, the home assistant can also provide responses in other visual or audio forms (e.g., as text, alerts, music, videos, animations, etc.).

As shown in FIG. 1A, in some embodiments, a digital assistant system is implemented according to a client-server model. The digital assistant system includes a client-side portion 102 (hereafter "digital assistant (DA) client 102") executed on a user device 104 (e.g., a smartphone, a tablet, or a central communication hub), and a server-side portion 106 (hereafter "digital assistant (DA) server 106") executed on a server system 108. The DA client 102 communicates with the DA server 106 through one or more networks 110. The DA client 102 provides client-side functionalities such as user-facing input and output processing and communications with the DA server 106. The DA server 106 provides server-side functionalities for any number of DA clients 102 each residing on a respective user device 104 (e.g., user devices registered for different household accounts). In the conventional configuration shown in FIG. 1A, the user device 104 that installs the digital assistant client 102 is the only device that receives voice input from the user and output the voice output to the user. The user must speak directly to the user device 104 to interact with the digital assistant. Other devices (e.g., home appliances 124) in the smart home environment 122 are controlled by the digital assistant server 106 after the digital assistant server determines the user's intent and the destination device that the user intends to control using the voice command. The voice input/our interfaces on the devices 124 are not utilized when interacting with the digital assistant 106. If some of the devices 124 are not located in the same room as the user device 104, the user will not have visual confirmation of whether the task is performed properly on those devices. For example, the user may speak directly into the user device 104 to trigger the digital assistant to turn on the air conditioner, the voice input is transmitted to the digital assistant server 106, the voice feedback is transmitted from the digital assistant server 106 back to the user device, and a control instruction is sent from the digital assistant server to the air conditioner (e.g., HVAC). When the user wishes to control a device with its own voice-enabled interface (e.g., the smart refrigerator 124(*c*)), the user speaks directly to the device, the device processes the command locally or contact a remote server to process the command, and performs the function after the command is recognized. During the process, the refrigerator does not invoke the digital assistant, and the digital assistant does not receive the voice input and does not provide the control instructions back to the device.

In some embodiments, the DA server 106 includes a client-facing I/O interface 112, one or more processing modules 114, data and models 116, and an I/O interface to external services 118. The client-facing I/O interface facilitates the client-facing input and output processing for the digital assistant server 106. The one or more processing modules 114 utilize the data and models 116 to determine the user's intent based on natural language input and perform task execution based on the deduced user intent. In some embodiments, the DA server 106 communicates with external services 120 (e.g., navigation service(s), messaging service(s), information service(s), calendar services, home appliance control service(s), etc.) through the network(s) 110 for task completion or information acquisition. The I/O interface to the external services 118 facilitates such communications.

Examples of the user device 104 include, but are not limited to, a home control center device, a central communication hub (e.g., Amazon's Echo, Apple's HomePod, etc.), a handheld computer, a personal digital assistant (PDA), a tablet computer, a laptop computer, a desktop computer, a cellular telephone, a smartphone, a remote control, or a combination of any two or more of these data processing devices or any other suitable data processing devices.

Examples of the communication network(s) 110 include local area networks (LAN) and wide area networks (WAN), e.g., the Internet. The communication network(s) 110 may be implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some embodiments, there is a network router that connects the different devices in the smart home environment 122 to the network 110, and routes the communications in and out of the smart home environment to and from the digital assistant. The network router does not intelligently process the communications that goes in and out of the smart home environment for purposes other than data communication (e.g., routing the messages to their destinations based on the addresses specified in the communications) and the network router is considered to be part of the network 110, as opposed to part of the controlled devices or the digital assistant client or server.

The server system 108 can be implemented on at least one data processing apparatus and/or a distributed network of computers. In some embodiments, the server system 108 also employs various virtual devices and/or services of third party service providers (e.g., third-party cloud service providers) to provide the underlying computing resources and/or infrastructure resources of the server system 108.

Figure 1B:
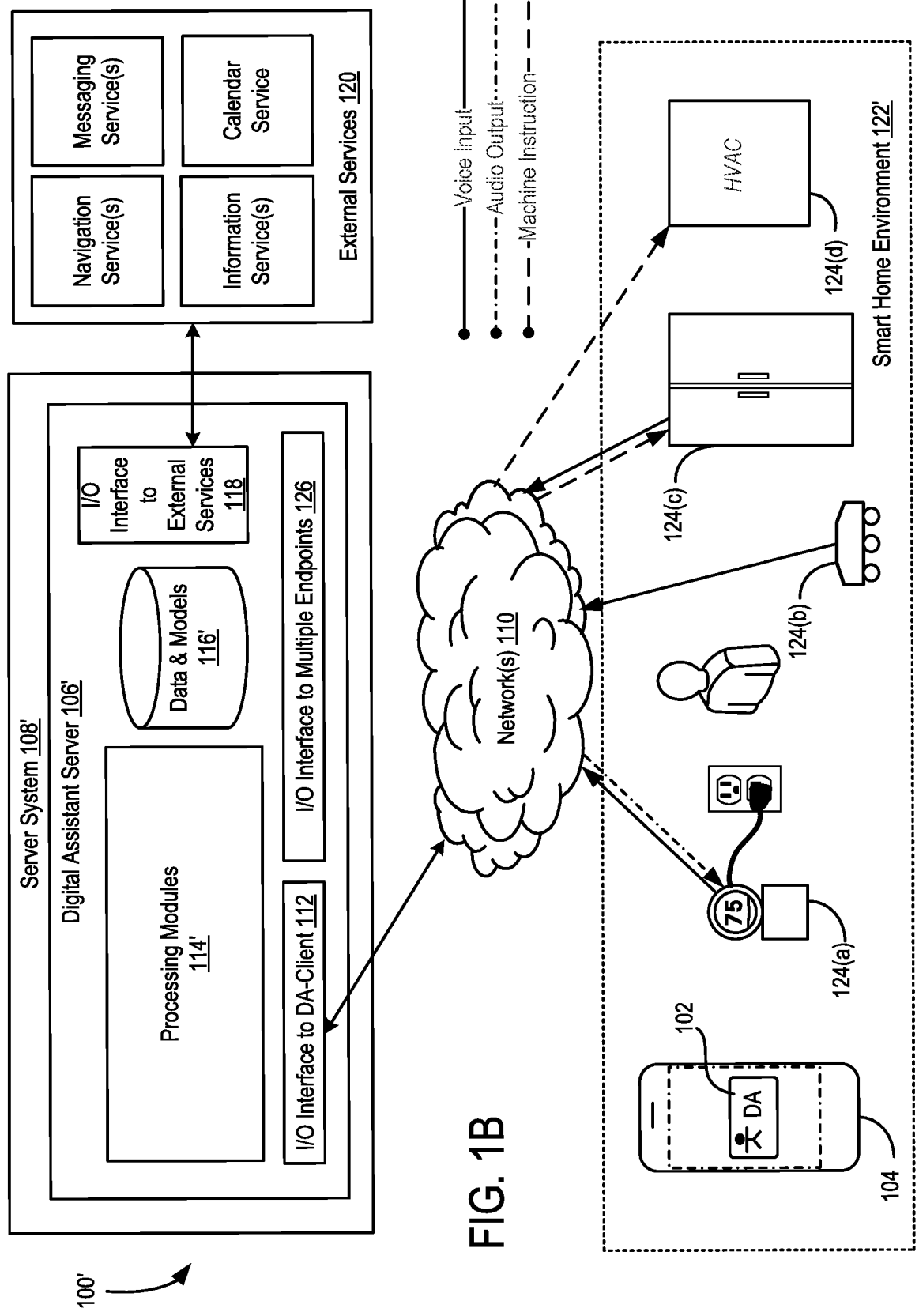
FIG. 1B is a block diagram illustrating an improved configuration in which a digital assistant operates through a voice-based user interface with dynamically switchable endpoints (e.g., input devices, output devices, and controlled devices) in accordance with some embodiments.

FIG. 1B is a block diagram of an operating environment 100' of a digital assistant in accordance with an improved configuration. In the improved configuration, the digital assistant directly interfaces and communicates with multiple endpoint devices (e.g., devices 124) instead of or in addition to the digital assistant client 102 installed on the user device 104. Each device 124 that includes an audio input interface (e.g., a microphone) can serve as a voice input endpoint device for the digital assistant, and captures voice input uttered by a user. The user can move about the smart home environment 122', and multiple devices 124 that are located in the vicinity of the user can capture the same voice input, and independently transmit the voice input to the digital assistant server 106 through their own communication channels to the digital assistant server. On the server-side, the digital assistant server 106' optionally includes an I/O interface 126 to Multiple Endpoint Devices (e.g., including a multi-channel input collection interface for collecting voice inputs from multiple endpoint devices, and a multi-channel output dispatch interface for dispatching audio outputs and machine commands to multiple endpoint devices).

The functions of the digital assistant server 106' in FIG. 1B includes all of the functions of the digital assistant server 106 described with respect to FIG. 1A, and additional functions for dynamically switching between multiple input endpoints and multiple output endpoints in real-time based on the current scenario and the user's requested task.

As shown in FIG. 1B, in some embodiments, the digital assistant system is implemented according to a client-server model. The digital assistant system optionally includes a client-side portion 102 (hereafter "digital assistant (DA) client 102) executed on a user device 104 (e.g., a smartphone, a tablet, or a central communication hub), and a server-side portion 106' (hereafter "digital assistant (DA) server 106') executed on a server system 108. The DA client 102 communicates with the DA server 106 through one or more networks 110. Each of the devices 124 also implements a thin client that communicates with the digital assistant server 106' (e.g., sending audio streams containing voice inputs of the user that have been captured locally, receiving audio outputs and commands from the digital assistant server, outputting the audio outputs, and/or performing a required task). Some of the devices 124 (e.g., a smart thermostat, a smart refrigerator, etc.) include both voice input interfaces and audio output interfaces. Some of the devices 124 (e.g., a smart oven, or a smart vacuum cleaner, etc.) include only audio input interfaces. Some of the devices 124 (e.g., a remotely controllable HVAC system, a remotely controllable light bulb, etc.) do not include audio input interfaces or audio output interfaces. Some of the devices 124 (e.g., a home intercom system) do not perform any functions in accordance of user commands received over a network, but can provide the voice input and output interfaces for the digital assistant system (e.g., in addition to the basic functions of an intercom). Some devices 124 have their own voice-control systems that may be used independently from the digital assistant system (e.g., by the user's pressing on a button on the device itself to activate the local voice-control system, rather than invoking the digital assistant system). In some embodiments, the local voice-control systems of individual devices 124 are bypassed when the devices are registered with the digital assistant system. As shown in FIG. 1B, the user may speak in the middle of the house, and the voice input is captured by three endpoint devices 124 (e.g., a thermostat, a vacuum cleaner, and a refrigerator), three audio input streams containing the voice input are sent to the digital assistant in three independent input channels between the respective endpoint devices and the digital assistant. The digital assistant picked one of the three audio input streams to process the user's voice input, and sends an audio output to one of the endpoint devices (e.g., the thermostat) based on various criteria. The digital assistant also sends machine instructions (e.g., for two different tasks) to two separate controlled devices (e.g., the refrigerator and the air conditioner) respectively, through the respective communication channels between the two controlled devices and the digital assistant. The user device 104 is not required in these communications.

In some embodiments, the DA server 106' includes one or more processing modules 114', data and models 116', an I/O interface to DA-client 112, an I/O interface to external services 118', and an I/O interface to multiple endpoints 126. The client-facing I/O interface 112 facilitates the client-facing input and output processing for the digital assistant server 106'. The I/O interface 126 to multiple endpoint devices 126 facilitates the input and output processing for multiple endpoint devices that do not have the regular digital assistant client-side module 102 installed on a central control device or communication hub (e.g., user device 104). The one or more processing modules 114' utilize the data and models 116' to determine the user's intent based on natural language input and perform task execution based on the deduced user intent. In some embodiments, the DA server 106' communicates with external services 120 (e.g., navigation service(s), messaging service(s), information service (s), calendar services, home appliance control service(s), etc.) through the network(s) 110 for task completion or information acquisition. The I/O interface to the external services 118 facilitates such communications. The I/O interface to multiple endpoints 126 facilitates the multi-channel communications between the digital assistant sever and the different input endpoint devices, output endpoint devices, and controlled endpoint devices. More details of the I/O interface to multiple endpoint is provided with respect to FIG. 3B and accompanying descriptions.

In some embodiments, the digital assistant is triggered by the same wake-up word uttered by the user, regardless of which device at the smart home environment actually captured the user's utterance and transmitted the utterance to the digital assistant server 106'. In some embodiments, the different devices 124 uses different wake up words, but the wake-up word captured in an utterance by any of the devices 124 will wake up the digital assistant once the utterance is transmitted to the digital assistant server by one or more of the devices 124 and identified by the digital assistant server 106'.

In some embodiments, each device 124 that has a built-in microphone and is network-enabled can capture a user's wake-up word and voice command when the user's voice is sufficiently loud to trigger the operation of the microphone. Whenever the microphone of any of the devices 124 is activated by the user's voice, the device will package up the voice input that has been captured and send it to the digital assistant server 106' over the network 110 through an independent communication channel between the device and the digital assistant server, without requiring the participation of a central control device 104 such as a digital assistant client operating on a smartphone or a central communication hub located at the smart home environment 122. In some embodiments, each device that captures a voice input places a timestamp for the voice input and a device identifier of the device on the packaged voice input before sending it to the digital assistant server, such that the digital assistant can use the timestamp information and device identifier in multiple audio input streams containing the voice input that have been received from different input endpoint devices to correlate the voice inputs, perform audio enhancement, and select the voice input on which to perform intent deduction.

In some embodiments, each smart home environment 122 has a centralized cloud account which manages all registered smart devices 124 that are associated with the smart home environment and that are reachable/controllable over the network 110. The smart devices 124 are required to comply with an API to communicate with the digital assistant server. Once the digital assistant server receives a voice input, no matter which particular smart device(s) transmitted the voice input to the digital assistant server, the digital assistant server will analyze the voice input and determine the user's intent, and send a proper command and audio feedback to a proper smart device to playback the audio output or to perform a requested task in accordance with the command. As long as the user's voice input is captured by one of the devices 124 that have an audio input interface and that is network enabled (e.g., the user does not need to be near any particular device that it needs to control, or be near a central communication hub), the digital assistant can be activated and control any of the devices 124 (e.g., devices that are not necessary voice input enabled) based on the user's request in the voice input.

Figure 2:
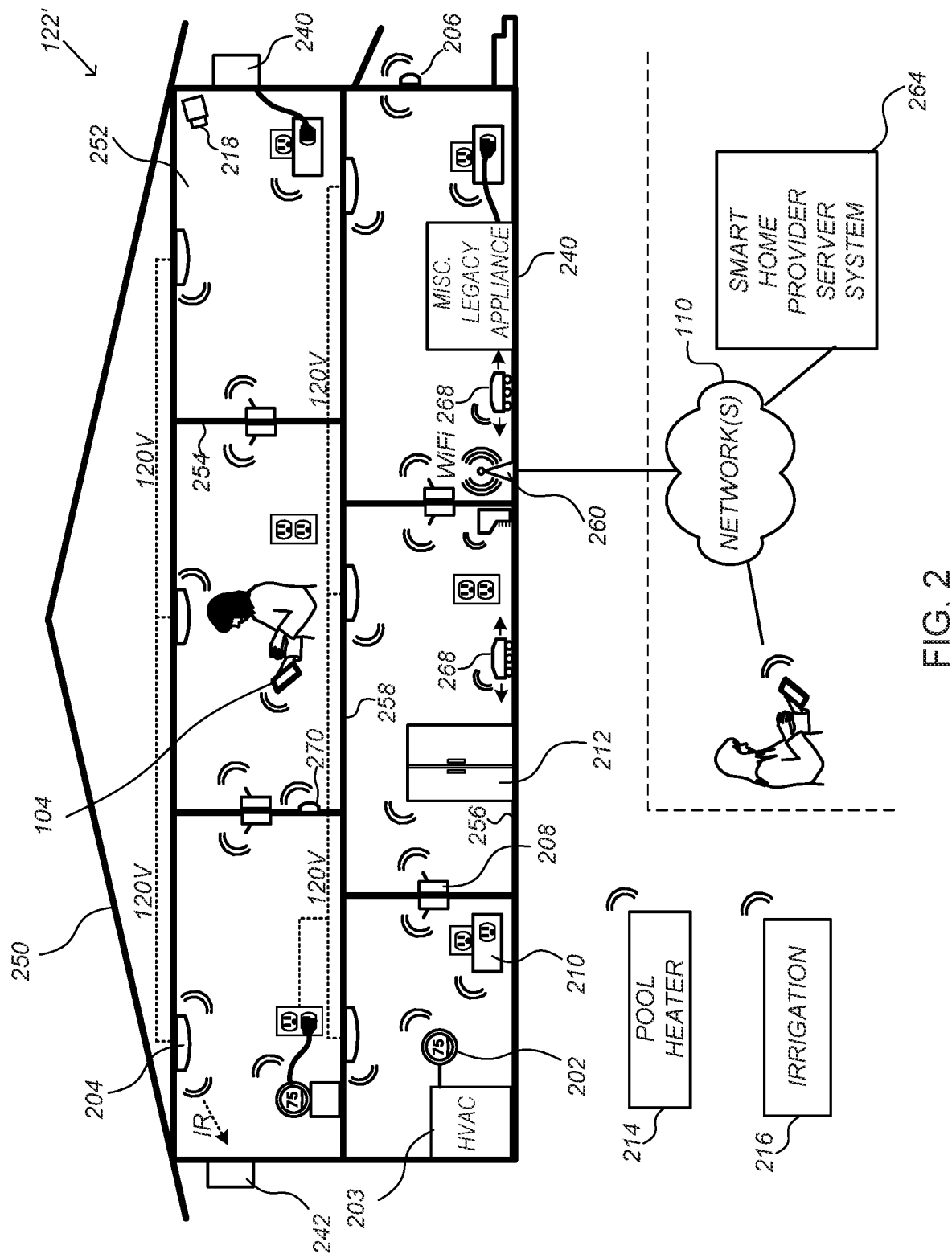
FIG. 2 is a smart home environment including multiple home devices that are controllable by a digital assistant in accordance with some embodiments.

FIG. 2 is an exemplary smart home environment 122' in accordance with some implementations. Smart home environment 122' includes a structure 250, which is optionally a house, office building, garage, or mobile home. It will be appreciated that devices may also be integrated into a smart home environment 122' that does not include an entire structure 250, such as an apartment, condominium, or office space. Further, the smart home environment may control and/or be coupled to devices outside of the actual structure 250. Indeed, several devices in the smart home environment need not be physically within the structure 250. For example, a device controlling a pool heater 214 or irrigation system 216 may be located outside of structure 250.

The depicted structure 250 includes a plurality of rooms 252, separated at least partly from each other via walls 254. The walls 254 may include interior walls or exterior walls. Each room may further include a floor 256 and a ceiling 258. Devices may be mounted on, integrated with and/or supported by a wall 254, floor 256 or ceiling 258.

In some implementations, the smart home environment 122 includes a plurality of devices, including intelligent, multi-sensing, network-connected devices, that integrate seamlessly with each other in a smart home network and/or with a central server or a cloud-computing system (e.g., the digital assistant 106' in FIG. 1B, which may be part of a smart home provider server system 264) to provide a variety of useful smart home functions. The smart home environment 122 may include various devices 124, such as one or more thermostats 202, hazard detection units 204, and entryway interface devices 206 (e.g., doorbells, locks, etc.). In some embodiments, some of the devices 124 may be intelligent, multi-sensing, and network enabled. In some embodiments, some of devices 124 may be provided with an audio input interface. In some embodiments, some of the devices 124 may be without an audio input and/or output interface. In some implementations, the devices 124 performs various functions in response to commands received from the user via a local touch-screen or button interface, or received from a server 264 or digital assistant 106' over a network 110. For example, thermostat 202 detects ambient climate characteristics (e.g., temperature and/or humidity) and controls a HVAC system 203 accordingly. The hazard detector 204 may detect the presence of a hazardous substance or a substance indicative of a hazardous substance (e.g., smoke, fire, and/or carbon monoxide) and activates a ventilation system or sound an alarm. The doorbell 406 may detect a person's approach to or departure from a location (e.g., an outer door), control doorbell functionality, announce a person's approach or departure via audio or visual means, and/or control settings on a security system (e.g., to activate or deactivate the security system when occupants go and come).

In some implementations, the smart home environment 122' includes various devices 124, such as one or more wall switches 208, along with one or more wall plug interfaces 210. In some embodiments, some of the devices 124 may be intelligent, multi-sensing, and network enabled. In some embodiments, some of devices 124 may be provided with an audio input interface. In some embodiments, some of the devices 124 may be without an audio input and/or output interface. In some implementations, the devices 124 performs various functions in response to commands received from the user via a local touch-screen or button interface, or received from a server 264 or digital assistant 106' over a network 110. For example, wall switches 208 may detect ambient lighting conditions, detect room-occupancy states, and control a power and/or dim state of one or more lights. In some instances, wall switches 208 may also control a power state or speed of a fan, such as a ceiling fan. The wall plugs 210 may detect occupancy of a room or enclosure and control supply of power to one or more wall plugs (e.g., such that power is not supplied to the plug if nobody is at home).

In some implementations, the smart home environment 122 includes various devices 124, such as a plurality of appliances 212, such as refrigerators, stoves, ovens, televisions, washers, dryers, lights, stereos, intercom systems, garage-door openers, floor fans, ceiling fans, wall air conditioners, pool heaters, irrigation systems, security systems, space heaters, window AC units, motorized duct vents, and so forth. In some embodiments, some of the devices 124 may be intelligent, multi-sensing, and network enabled. In some embodiments, some of devices 124 may be provided with an audio input interface. In some embodiments, some of the devices 124 may be without an audio input and/or output interface. In some implementations, the devices 124 performs various functions in response to commands received from the user via a local touch-screen or button interface, or received from a server 264 or digital assistant 106' over a network 110. For example, in some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol.

The smart home may also include a variety of non-communicating legacy appliances 240, such as old conventional washer/dryers, refrigerators, and the like, which may be controlled by smart wall plugs 210. The smart home environment 122 may further include a variety of partially communicating legacy appliances 242, such as infrared ("IR") controlled wall air conditioners or other IR-controlled devices, which may be controlled by IR signals provided by the smart hazard detectors 204 or the smart wall switches 208. In some embodiments, these legacy appliances may serve as controlled devices based on commands encoded in the signals in the power lines that are transmitted from the digital assistant server and relayed to the appliances over the power lines.

In some implementations, the smart home environment 1220 includes one or more network-connected cameras 218 that are configured to provide video monitoring and security in the smart home environment 122. In some embodiments, the user's current locations and the current locations of the different endpoint devices may be deduced by the digital assistant from images captured by the one or more network-connected cameras.

In some embodiments, the smart home environment 122 may also include devices outside of the physical home but within a proximate geographical range of the home. For example, the smart home environment 122 may include a pool heater monitor 214 that communicates a current pool temperature to other devices within the smart home environment 200 and/or receives commands for controlling the pool temperature. Similarly, the smart home environment 122 may include an irrigation monitor 216 that communicates information regarding irrigation systems within the smart home environment 122 and/or receives control information for controlling such irrigation systems. In some embodiments, these devices outside of the physical home may also serve as the input endpoint devices, output endpoint devices, and/or controlled endpoint devices of the digital assistant as described herein.

By virtue of network connectivity, one or more of the devices of FIG. 2 may further allow a user to interact with the device even if the user is not proximate to the device. For example, a user may communicate with a device using a computer (e.g., a desktop computer, laptop computer, or tablet) or other portable electronic device (e.g., a smartphone) 266. A webpage or application may be configured to receive communications from the user and control the device based on the communications and/or to present information about the device's operation to the user. For example, the user may view a current set point temperature for a device and adjust it using a computer. The user may be in the structure during this remote communication or outside the structure. In addition to using the interface provided on a smart device or computer 266, the user may also control devices via voice inputs transmitted through the multi-endpoint digital assistant system described herein.

As discussed above, a user (e.g., an individual who lives in the home) may register all the devices 124 with the smart home provider system 264 or digital assistant server 106'. The user may also register a control device (e.g., device 266) to control all the devices 124 from a remote location after authentication. When the user is located inside of the structure, such control can be performed using voice inputs without going through the control device 266. The authentication is optionally performed based on the voice input (e.g., a comparison between a voiceprint extracted from the user's voice input and a voiceprint of an authorized user that is stored at the digital assistant server).

In some implementations, devices 124 (e.g., including devices 202, 204, 206, 208, 210, 212, 214, 216 and/or 218) are capable independently establishing data communications and information sharing with other smart devices, a central server or cloud-computing system (e.g., digital assistant server 106'), and/or other devices that are network-connected. The required data communications may be carried out using any of a variety of custom or standard wireless protocols (IEEE 802.15.4, Wi-Fi, ZigBee, 6LoWPAN, Thread, Z-Wave, Bluetooth Smart, ISA100.11a, WirelessHART, MiWi, etc.) and/or any of a variety of custom or standard wired protocols (CAT6 Ethernet, HomePlug, etc.), or any other suitable communication protocol, including communication protocols not yet developed as of the filing date of this document.

In some embodiments, one or more of the devices 124 in the home include open audio input channels that can capture audio input in their vicinity and serve as the audio input device for the digital assistant that controls all the registered devices installed in the home. In some embodiments, one of the smart devices in the smart home environment includes the digital assistant module and serves as the digital assistant server 106' that manages all the registered devices installed in the home.

Figure 3A:
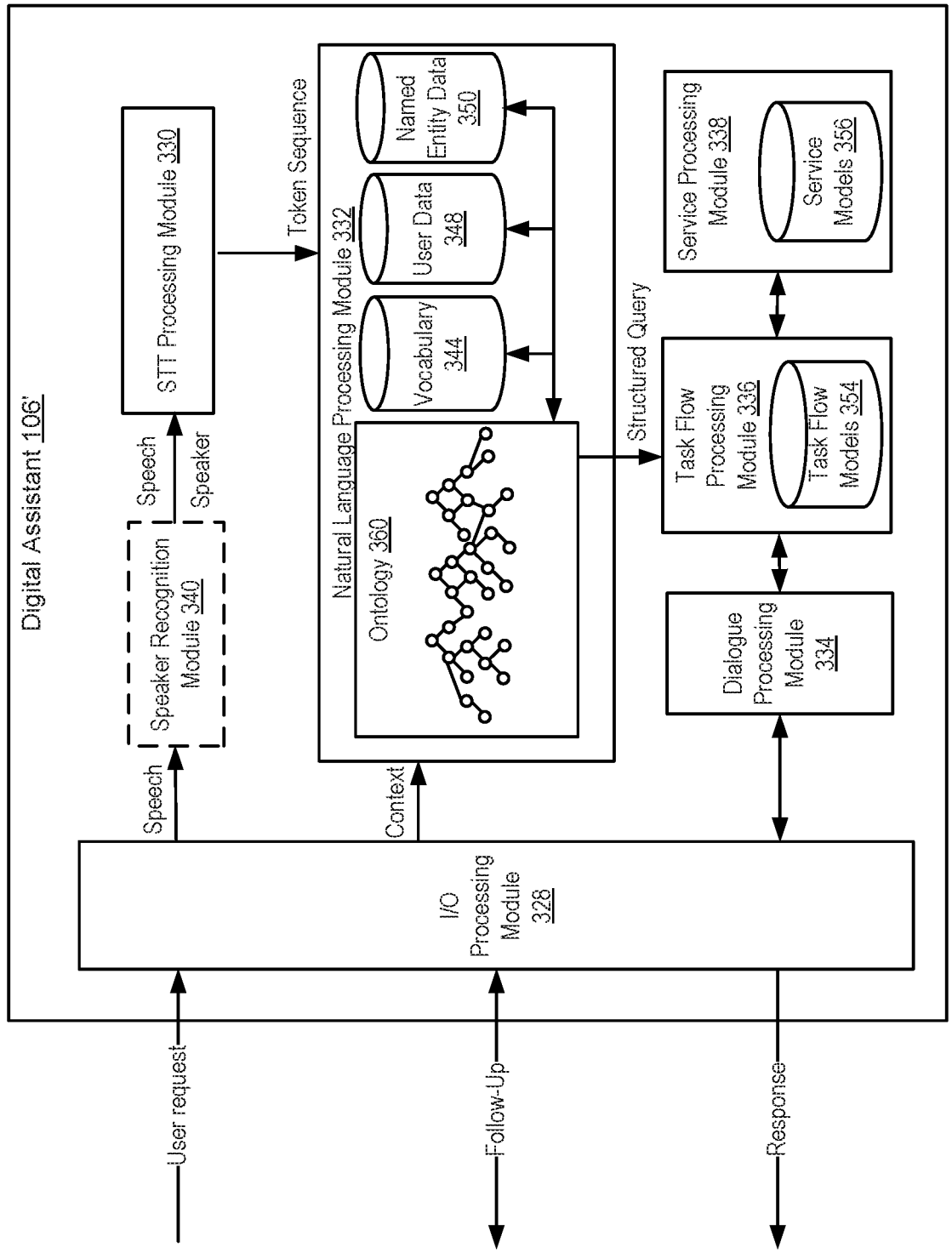
FIG. 3A is a block diagram illustrating functions of a digital assistant in accordance with some embodiments.

FIG. 3A is a block diagram of an exemplary digital assistant server system 106' in accordance with some embodiments. It should be noted that the digital assistant system 106' is only one example of a digital assistant system, and that the digital assistant system 106' may have more or fewer components than shown, may combine two or more components, or may have a different configuration or arrangement of the components. The various components shown in FIG. 3A may be implemented in hardware, software, firmware, including one or more signal processing and/or application specific integrated circuits, or a combination of thereof. The digital assistant system 106' includes memory, one or more processors, one or more input/output (I/O) interfaces, and a network communications interface. These components communicate with one another over one or more communication buses or signal lines.

As shown in FIG. 3A, in some embodiments, the I/O processing module 328 interacts with the user, a user device (e.g., a user device 104 in FIG. 1B), and other devices (e.g., endpoint devices 124 in FIG. 1B) through the network communications interface to obtain user input (e.g., a speech input) and to provide responses to the user input. The I/O processing module 328 optionally obtains context information associated with the user input from the user device, along with or shortly after the receipt of the user input. The context information includes user-specific data, vocabulary, and/or preferences relevant to the user input. In some embodiments, the context information also includes software and hardware states of the devices 124 at the time the user request is received, and/or information related to the surrounding environment of the user at the time that the user request was received. In some embodiments, the I/O processing module 328 also sends follow-up questions to, and receives answers from, the user regarding the user request. In some embodiments, when a user request is received by the I/O processing module 328 and the user request contains a speech input, the I/O processing module 328 forwards the speech input to speaker recognition module 340 for speaker recognition and subsequently to the speech-to-text (STT) processing module 330 for speech-to-text conversions. In some embodiments, person-specific speech-to-text models are selected to perform the speech-to-text conversion based on the speaker recognition result.

In some embodiments, the speech-to-text processing module 330 receives speech input (e.g., a user utterance captured in a voice recording) through the I/O processing module 328 or the speaker recognition module 340. In some embodiments, the speech-to-text processing module 330 uses various acoustic and language models to recognize the speech input as a sequence of phonemes, and ultimately, a sequence of words or tokens written in one or more languages. The speech-to-text processing module 330 is implemented using any suitable speech recognition techniques, acoustic models, and language models, such as Hidden Markov Models, Dynamic Time Warping (DTW)-based speech recognition, and other statistical and/or analytical techniques. In some embodiments, the speech-to-text processing can be performed at least partially by a third party service or on the user's device. Once the speech-to-text processing module 330 obtains the result of the speech-to-text processing (e.g., a sequence of words or tokens), it passes the result to the natural language processing module 332 for intent deduction.

The natural language processing module 332 ("natural language processor") of the digital assistant 106' takes the sequence of words or tokens ("token sequence") generated by the speech-to-text processing module 330, and attempts to associate the token sequence with one or more "actionable intents" recognized by the digital assistant. As used herein, an "actionable intent" represents a task that can be performed by the digital assistant 106' and/or devices subject to control by the digital assistant system, and has an associated task flow implemented in the task flow models 354. The associated task flow is a series of programmed actions and steps that the digital assistant system 106' takes in order to perform the task. The scope of a digital assistant system's capabilities is dependent on the number and variety of task flows that have been implemented and stored in the task flow models 354, or in other words, on the number and variety of "actionable intents" that the digital assistant system 106' recognizes. The effectiveness of the digital assistant system 106', however, is also dependent on the digital assistant system's ability to deduce the correct "actionable intent(s)" from the user request expressed in natural language.

In some embodiments, in addition to the sequence of words or tokens obtained from the speech-to-text processing module 330, the natural language processor 332 also receives context information associated with the user request (e.g., from the I/O processing module 328). The natural language processor 332 optionally uses the context information to clarify, supplement, and/or further define the information contained in the token sequence received from the speech-to-text processing module 330. The context information includes, for example, user preferences, hardware and/or software states of the user device, sensor information collected before, during, or shortly after the user request, prior interactions (e.g., dialogue) between the digital assistant and the user, and the like.

In some embodiments, the natural language processing is based on an ontology 360. The ontology 360 is a hierarchical structure containing a plurality of nodes, each node representing either an "actionable intent" or a "property" relevant to one or more of the "actionable intents" or other "properties." As noted above, an "actionable intent" represents a task that the digital assistant system is capable of performing (e.g., a task that is "actionable" or can be acted on). A "property" represents a parameter associated with an actionable intent or a sub-aspect of another property. A linkage between an actionable intent node and a property node in the ontology 360 defines how a parameter represented by the property node pertains to the task represented by the actionable intent node.

In some embodiments, the natural language processor 332 shown in FIG. 3A receives the token sequence (e.g., a text string) from the speech-to-text processing module 330, and determines what nodes are implicated by the words in the token sequence. In some embodiments, if a word or phrase in the token sequence is found to be associated with one or more nodes in the ontology 360 (via the vocabulary index 344), the word or phrase will "trigger" or "activate" those nodes. When multiple nodes are "triggered," based on the quantity and/or relative importance of the activated nodes, the natural language processor 332 will select one of the actionable intents as the task (or task type) that the user intended the digital assistant to perform. In some embodiments, the domain that has the most "triggered" nodes is selected. In some embodiments, the domain having the highest confidence value (e.g., based on the relative importance of its various triggered nodes) is selected. In some embodiments, the domain is selected based on a combination of the number and the importance of the triggered nodes. In some embodiments, additional factors are considered in selecting the node as well, such as whether the home assistant system 300 has previously correctly interpreted a similar request from a user.

In some embodiments, the digital assistant system 106' also stores names of specific entities in the named entity database 350, so that when one of these names is detected in the user request, the natural language processor 332 will be able to recognize that the name refers to a specific instance of a property or sub-property in the ontology. In some embodiments, the names of specific entities are names of businesses, restaurants, people, movies, and the like. In some embodiments, the named entity database 305 also includes the aliases of the home devices that are provided by individual users during the device registration stage for the different home devices. In some embodiments, the digital assistant system can search and identify specific entity names from other data sources, such as the user's address book or contact list, a movies database, a musicians database, and/or a restaurant database. In some embodiments, when the natural language processor 332 identifies that a word in the token sequence is a name of a specific entity (such as an alias give to an appliance by a user), that word is given additional significance in selecting the actionable intent within the ontology for the user request. In some embodiments, the trigger phrase for the digital assistant is stored as a named entity, so that it can be identified and given special significance when it exists in the speech input of the user.

User data 348 includes user-specific information, such as user-specific vocabulary, user preferences, user address, user's default and secondary languages, user's contact list, and other short-term or long-term information for each user. The natural language processor 332 can use the user-specific information to supplement the information contained in the user input to further define the user intent. In some embodiments, the user data also includes the user's specific voiceprint for user authentication or speech samples for speaker recognition training.

Once the natural language processor 332 identifies an actionable intent (or domain) based on the user request, the natural language processor 332 generates a structured query to represent the identified actionable intent. In some embodiments, the structured query includes parameters for one or more nodes within the domain for the actionable intent, and at least some of the parameters are populated with the specific information and requirements specified in the user request.

In some embodiments, the natural language processor 332 passes the structured query (including any completed parameters) to the task flow processing module 336 ("task flow processor"). The task flow processor 336 is configured to perform one or more of: receiving the structured query from the natural language processor 332, completing the structured query, and performing the actions required to "complete" the user's ultimate request. In some embodiments, the various procedures necessary to complete these tasks are provided in task flow models 354. In some embodiments, the task flow models 354 include procedures for obtaining additional information from the user, and task flows for performing actions associated with the actionable intent. In some embodiments, the task flows in the task flow models 354 describe the steps for controlling each home device that is registered with the home assistant, and based on the device name list the digital assistant operates to execute the steps in a suitable task flow with respect to the home device that is specified by the alias of the home device in the user's speech input. In some embodiments, the steps to perform a requested task includes a list of encoded instructions that are to be sent to a controlled device (e.g., a home appliance) over the network, such that the controlled device executes those encoded instructions to accomplished the required intent of the user.

In some embodiments, in order to complete a structured query, the task flow processor 336 may need to initiate additional dialogue with the user in order to obtain additional information, and/or disambiguate potentially ambiguous utterances. When such interactions are necessary, the task flow processor 336 invokes the dialogue processing module 334 ("dialogue processor") to engage in a dialogue with the user. In some embodiments, the dialogue processing module 334 determines how (and/or when) to ask the user for the additional information, and receives and processes the user responses.

In some embodiments, the questions are provided to and answers are received from the users through the I/O processing module 328. In some embodiments, the dialogue processing module 334 generates the audio outputs embodying the questions that needed to be answered by the user, and sends the audio outputs to an output endpoint device selected by the digital assistant where the selected output device presents the questions to the user. The user's responses is captured by one or more input endpoint devices and transmitted to the digital assistant, where the digital assistant process the voice response received from a selected input endpoint device and obtain the required clarifications from the voice response. During the multiple exchanges between the digital assistant, the user could be moving around in the house, and listening to the digital assistant's outputs from different output endpoint devices 124, and having his/her answers picked up by different sets of one or more input endpoint devices 124 depending on the locations of the user when those outputs are delivered to the user and when the user provided his/her answers to the digital assistant. Once answers are received from the user, the dialogue processing module 334 populates the structured query with the missing information, or passes the information to the task flow processor 336 to complete the missing information from the structured query.

Once the task flow processor 336 has completed the structured query for an actionable intent, the task flow processor 336 proceeds to perform the ultimate task associated with the actionable intent. Accordingly, the task flow processor 336 executes the steps and instructions in the task flow model according to the specific parameters contained in the structured query. In some embodiments, the steps and instructions in the task flow model includes identifying a particular device 124 that the user intends to control using the voice command, encoding one or more machine commands based on the API of the particular device 124, and sending the encoded machine command to the particular device 124 over the network.

In some embodiments, the task flow processor 336 employs the assistance of a service processing module 338 ("service processor") to complete a task requested in the user input or to provide an informational answer requested in the user input. For example, the service processor 338 can act on behalf of the task flow processor 336 to send a command to a home appliance, make a phone call, set a calendar entry, invoke a map search, invoke or interact with other user applications installed on the user device, and invoke or interact with third party services (e.g. a restaurant reservation portal, a social networking website or service, a banking portal, etc.). In some embodiments, the protocols and application programming interfaces (API) required by each service can be specified by a respective service model among the service models 356. The service processor 338 accesses the appropriate service model for a service and generates requests for the service in accordance with the protocols and APIs required by the service according to the service model.

In some embodiments, the natural language processor 332, dialogue processor 334, and task flow processor 336 are used collectively and iteratively to deduce and define the user's intent, obtain information to further clarify and refine the user intent, and finally generate a response (e.g., provide an output to the user, or complete a task) to fulfill the user's intent.

In some embodiments, after all of the tasks needed to fulfill the user's request have been performed, the digital assistant 326 formulates a confirmation response, and sends the response back to the user through the I/O processing module 328. If the user request seeks an informational answer, the confirmation response presents the requested information to the user. In some embodiments, the digital assistant also requests the user to indicate whether the user is satisfied with the response produced by the digital assistant 326.

Figure 3B:
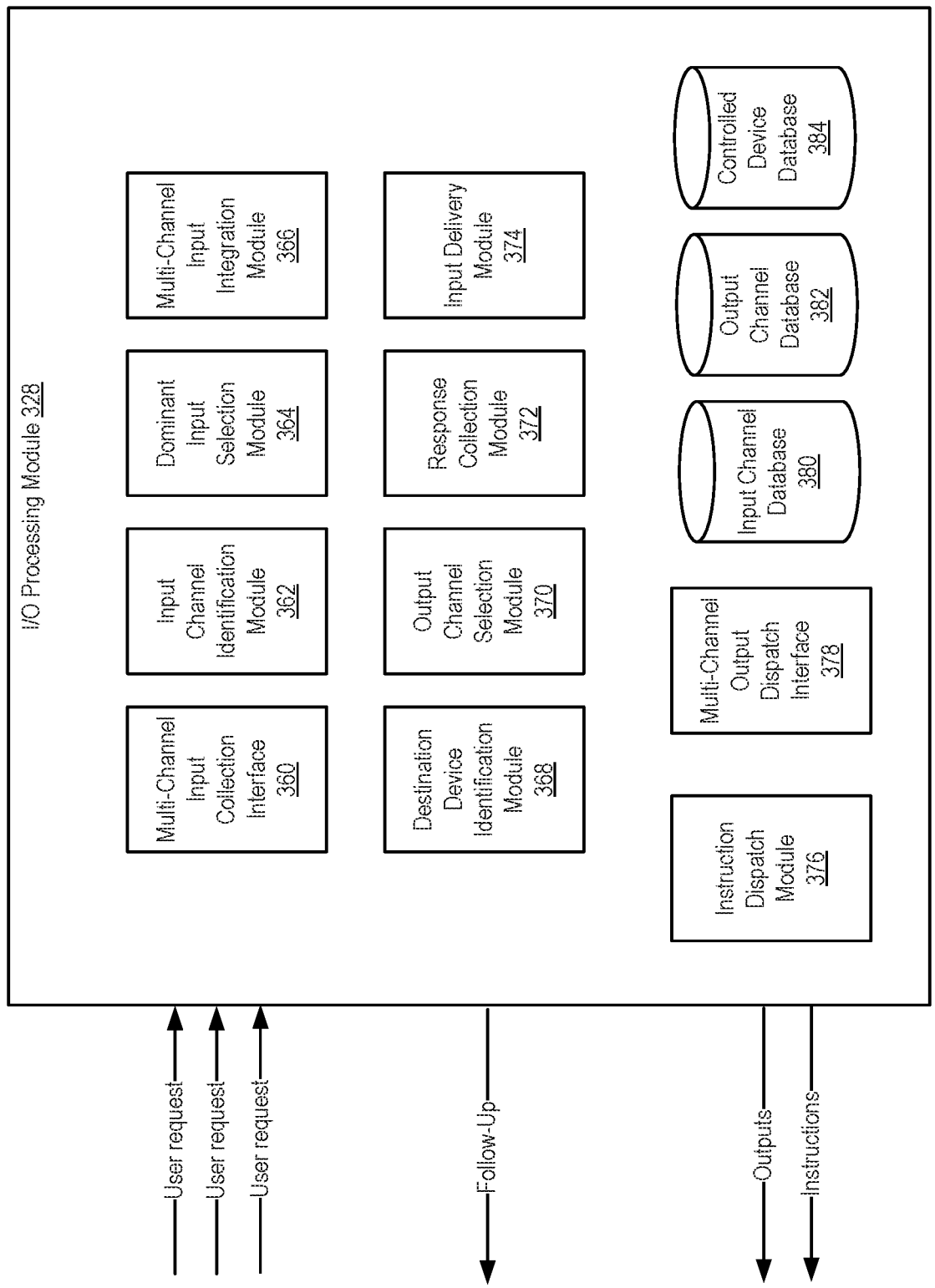
FIG. 3B is a block diagram illustrating the I/O processing module of a digital assistant in accordance with some embodiments.

FIG. 3B is a block diagram of a digital assistant's I/O processing module 328 in accordance with some embodiments. In some embodiments, the I/O processing module receives user requests embodied in voice inputs that are captured by one or more endpoint devices 124 that are located near the user when the voice inputs are uttered by the user. The I/O processing module 328 outputs follow-up questions to the user to clarify ambiguities in the user's earlier voice inputs, and obtain necessary parameters for completing a task that is requested by the user using the earlier voice inputs. The I/O processing model 328 sends the follow-up questions to one or more endpoint devices 124 that are located near the user when the follow-up questions are generated. The I/O processing module 328 also provides informational answers, outputs audio of a media item as requested by the user via the voice inputs, and/or sends encoded machine instructions to a destination device that the user wishes to control using the voice inputs. The I/O processing module selects the endpoint devices to output the informational answers, audio of the media item, and/or the destination device based on the user's voice input, and/or based on the location of the user when the user's requested task is performed. It is to be noted that, the endpoint devices that capture the user's voice inputs, the endpoint devices that output the follow-up questions, and the endpoint devices that output the informational answer, audio of the media item, and the endpoint devices to which the encoded commands are sent, can all be different devices, and are dynamically selected during the interactions between the user and the digital assistant for a single executable intent/requested task.

As shown in FIG. 3B, the I/O processing module 328 of the digital assistant server 106' includes a multi-channel input collection interface 360, in accordance with some embodiments. The multi-channel input collection interface 360 includes a respective incoming channel for each of multiple devices 124 that have built-in audio input interfaces (e.g., microphones) and are network-enabled. The incoming channels are parallel and can receive inputs simultaneously from the devices 124. For example, when a user spoke while standing in proximity to three endpoint devices (e.g., devices A, B, C out of all registered endpoint devices 124 in the house) with built-in audio input interfaces, the user's voice input is captured by all three endpoint devices and respective audio streams containing the voice input are sent by the three endpoint devices separately through separate input channels of the multi-channel input collection interface 360 to the digital assistant. Other endpoint devices that are located far away from the user do not capture the user's voice input and does not utilize the multi-channel input collection interface 360 to send in any voice input at this time. In some embodiments, the multi-channel input collection interface 360 provides a timestamp and associates a respective input device ID with the voice input received from each respective input channel of the multi-channel input collection interface. In some embodiments, the input device ID is a unique network address of the input endpoint device that captured and transmitted the voice input to the digital assistant. In some embodiments, the multi-channel input collection interface 360 maintains a persistent audio input channel with each of the input endpoint devices that have a built-in audio input interface and that have been registered with the digital assistant. In some embodiments, the multi-channel input collection interface 360 opens an audio input channel in response to requests made by an input endpoint device.

In some embodiments, the I/O processing module 328 includes an input channel identification module 362. The input channel identification module 362 looks up the input channel database 380 to identify the particular input endpoint device(s) from which voice inputs are being collected at the present time. For example, based on the device identifier or network address of an input endpoint device that has transmitted a voice input to the digital assistant through an incoming channel of the multi-channel input collection interface 360, the input channel identification module 362 identifies the device name, device type, and optionally, device location, and/or device capabilities of the input endpoint device from which a current voice input has been transmitted to the I/O processing module 328. In some embodiments, the input channel identification module 362 determines the user's current location, and the user's movement around the smart home environment, based on the identification of the endpoint devices from which each voice input of the user is transmitted to the I/O processing module and the known locations of the identified endpoint devices.

In some embodiments, the I/O processing module 328 further includes a dominant input selection module 364 and/or a multi-channel input integration module 366. In some embodiments, the I/O processing module 328 selects one of the dominant input selection module 364 and the multi-channel input integration module 366 to process the audio input(s) received from the one or more input endpoint devices and provides a single audio input to the automatic speech to text (STT) processing module 330.

In some embodiments, the dominant input selection module 364 selects one of the multiple voice inputs that are transmitted from different endpoint devices in the vicinity of the user to be the dominant voice input that will be processed and used for intent deduction. For example, in some embodiments, one voice input stream is selected based on the clarity of the voice signals, or level of background noise, the fidelity of the voice input, and/or the volume of the voice input relative to background noise, etc.

In some embodiments, the input endpoint devices continuously monitor the background noise level when the voice input is being captured, and includes the noise level information in the communication with the I/O processing module (e.g., the multi-channel input collection interface). The I/O processing module uses the noise level information to estimate the signal-to-noise ratio of the voice input from the different input endpoint devices, and determines the best approach to select or combine the voice inputs that have been received. For example, in some embodiments, if the signal to noise ratio is above a predefined threshold (e.g., the voice input stream is of high quality, sufficient for automatic speech recognition), the dominant input selection module 364 simply selects the voice input with the best quality, or selects the input that has sufficient quality with the earliest arrival timestamp, as the dominant input for automatic speech recognition and intend deduction.

In some embodiments, if all of the voice input streams are of low quality (e.g., having signal to noise ratio below a threshold value, and not sufficiently good for automatic speech recognition), the multi-channel input integration module 366 applies spatial signal processing algorithms to synchronize the collected audio input streams, generated a weighted combination of the signals, and feed the combined signal as the voice input for automatic speech recognition and intent deduction.

In some embodiments, when the I/O processing module receives multiple captured audio streams with the same voice input from multiple endpoint devices, it can apply a variety of methods to combine the multiple audios streams containing the same voice input into single enhanced audio stream for more robust automatic speech recognition results. The natively spatial division information will increase audio signal quality that is being processed. In some embodiments, based on the information, such as locations and audio characteristics, known about the input endpoint devices that have transmitted the same voice input (e.g., voice inputs that have similar or identical audio content or audio characteristics, that are transmitted to the I/O processing module at or around the same time), the multi-channel input integration module selects the best set of processing methods to combine the inputs from the different sets of input endpoint devices to create the highest quality input stream for achieving the best automatic speech recognition results.

After the single voice input is provided by the input delivery module 374 to the speech-to-text processing module 330 (e.g., as shown in FIG. 3A), the speech-to-text processing module 330 obtains a token sequence from the voice input. The token sequence is provided to the natural language processing module 332, and an actionable intent (e.g., represented by a structured query) can be recognized based on the analysis of the token sequence. The structured query is provided to the task flow processing module 336 which generates the audio output and/or encoded machine commands for performing the requested task. In some embodiments, the response collection module 372 collects the audio outputs and/or machine commands from the task-flow processing module 336, the service processing module 338, and the dialogue processing module 334, and prepare the select the appropriate output channels to deliver the audio outputs and the machine commands.

In some embodiments, as shown in FIG. 3B, in order to dispatch the machine commands to the proper device(s) that the user intended to control, and/or output informational answers, clarification questions, and/or other audio outputs (e.g., music, alert sounds, etc.), the I/O processing module 328 is employed again to select the appropriate output channels and dispatching the audio outputs and encoded instructions to the identified output channels.

In some embodiments, the I/O processing module 328 includes a destination device identification module 368. For example, the destination device identification module 368 determines which output endpoint devices are currently in the vicinity of the user. Depending on the actual situation in the smart home environment, the set of endpoint devices that captured the voice inputs may not all have audio output capabilities, therefore, the destination device identification module 368 dynamically selects a set of output endpoint devices that are currently in the vicinity of the user, based on the locations of the output endpoint devices, and the current location of the user. In some embodiments, the destination device identification module 368 looks up the output endpoint devices in the output channel database 382 based on the known locations of the endpoint input devices from which the voice inputs were just received.

In some embodiments, the destination device identification module 368 also identifies the device that is to be controlled in accordance with the actionable intent deduced from the voice input. For example, if it has been determined that the user's intent is turn on the bedside lamp in the bedroom, and the task flow module 336 has identified the encoded command for turning on the lightbulb in the bedside lamp, the destination device identification module 368 identifies the light bulb associated with the bedroom location in the controlled device database 384, looks up the network address or a corresponding smart outlet that is connected to that light bulb, and identifies the proper destination for the encoded command. In another example, if the user's intent is to turn on the bedroom air conditioner, the destination device identification module 368 determines the user's identity and looks up the user's bedroom in the smart home environment, and identified the air conditioner in the user's bedroom as the controlled device for the current task. In some embodiments, the user's intent is to open a door lock.

The destination device identification module identifies all of the doors that are near the user's current location, and picks the lock of the closest door to the user as the controlled device.

In some embodiments, if the only action that needs to be performed is to control a controlled device, the encoded commands are delivered to the identified controlled device by the instruction dispatch module 376.

In some embodiments, if audio output needs to be provided to the user. The output channel selection module 370 selects one of the output endpoint devices that have been identified by the destination device identification module 368 as the endpoint device to output the audio output. In some embodiments, if the endpoint input device that produced the best voice input for the current round of interaction has output capabilities, and the user is still within the vicinity of that device, the output channel selection module 370 chooses that device to be the output device for an audio output. This is beneficial because, the user's probably speaking to that device in the first place, and using the same device to output an audio response will fit the user's expectation and not cause the user to feel confused and try to look for the source of the audio output.

In some embodiments, the output channel selection module 370 uses a set of prioritization rules to determine which of the set of available output endpoint devices identified by the destination device identification module 368 should be selected as the output device for the current audio output. The prioritization rules may be based on the location of the output devices relative to the location of the user (e.g., the device closest to the user is chosen), the audio quality of the output devices (e.g., the device with the highest sound quality is chosen), the type of output that is to be delivered to the user (e.g., different output devices are suitable for outputting alarm sound vs. music vs. speech), the power usage considerations, etc. In some embodiments, a score is calculated based on multiple considerations, and the output device with the best score is chosen as the output channel for the output by the output channel selection module 370.

In some embodiments, once the output channel is selected, the multi-channel output dispatch interface 378 delivers the audio output to the selected output channel through the outgoing communication channel between the I/O processing module 328 and the selected output endpoint device. In some embodiments, the output channel selection module uses the same output device for a continuous exchange between the user and the I/O processing module, for as long as the user is in the same room. When the user moves to a different room during the middle of the exchange, the output channel selection module 370 restarts the process and selects a new output device based on the new location of the user. By keeping the output device relative stable while the user is still in the same room allows the user to maintain context and focus, and is less distracting.

In some embodiments, if the output channel selection module 370 determines that one of the available output devices is a mobile device that moves with the user, the output channel selection module chooses to use that mobile device as the output channel for a continuous exchange between the user and the digital assistant. This helps to avoid constant waking up different devices that are in the vicinity of the user as the user is moving about the room or house. In some embodiments, when the user is not moving more than a threshold amount or distance during the exchange or does not have a mobile device that moves with him/her, the output channel selection module 370 selects the output device based on the location and audio quality of available output devices.

The functions and modules described with respect to FIG. 3B are merely illustrative. More or fewer functions and modules may be implemented in accordance various embodiments.

FIGS. 4A-4D illustrate a number of usage scenarios of the digital assistant with dynamically switchable endpoints, in accordance with some embodiments. The example scenarios may happen in a continuous exchange between the user and the digital assistant, or may occur separately during different exchanges between the user and the digital assistant. The example scenarios may occur in the order that they are presented (e.g., in a continuous exchange), or they may occur in a different order based on the actual situation. These examples are merely to illustrate the disclosed methods and systems, and are not meant to be rigid and limiting.

Figure 4A:
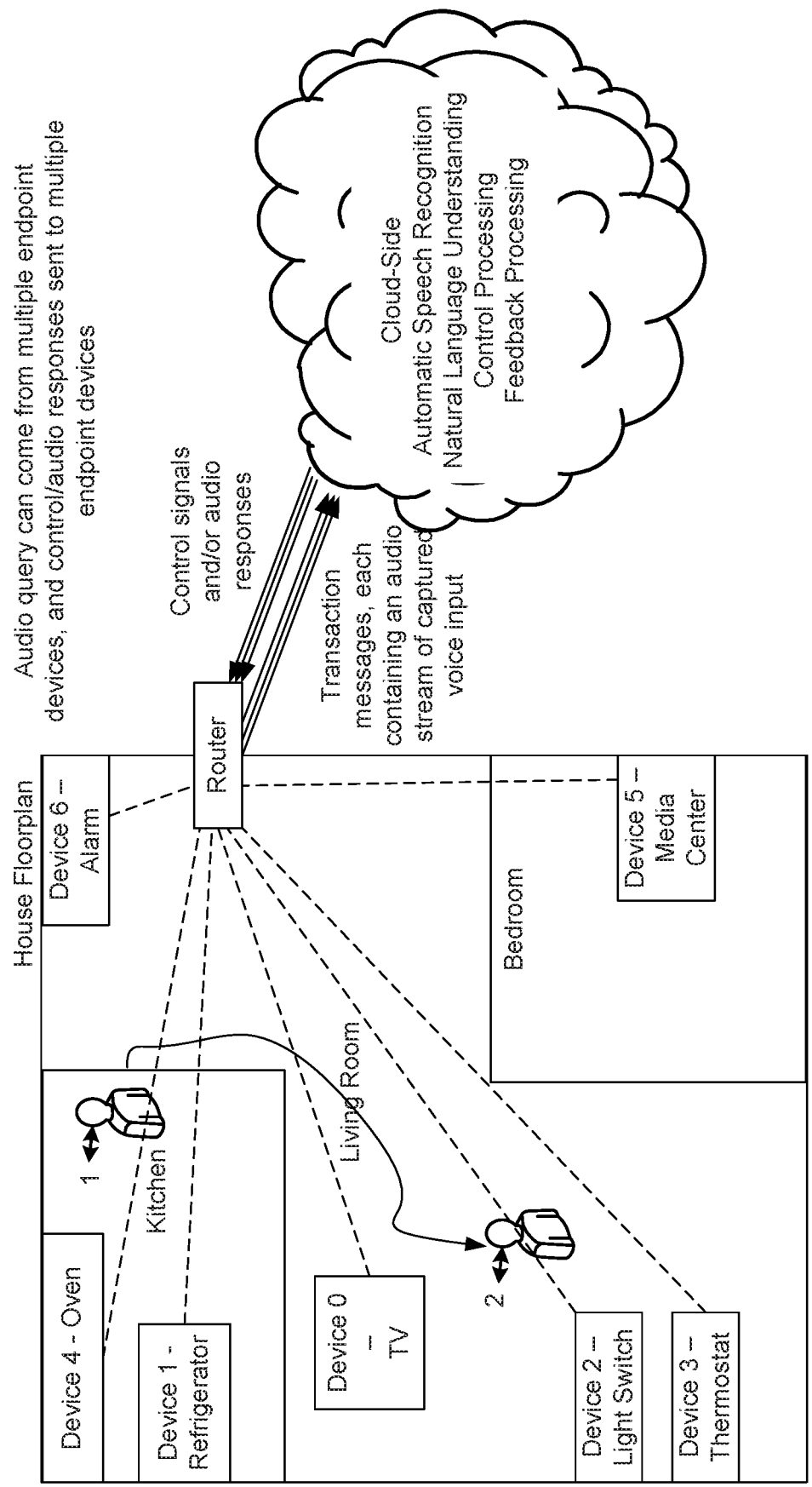
FIGS. 4A-4D are block diagrams illustrating various operating scenarios of a voice-based interface with dynamically switchable endpoints in accordance with some embodiments.

As disclosed herein, the digital assistant is capable of receiving multiple audio input streams concurrently through the multi-channel input collection interface, which interfaces with multiple audio input endpoint devices in the smart home environment. For example, as shown in FIG. 4A, there are six devices in the smart home environment. The seven devices are located in different parts of the house, and have different functions. For example, device 0 is a TV, device 1 is a refrigerator, device 2 is a light switch, device 3 is thermostat, device 4 is an oven, device 5 is a media center, and device 6 is a smart alarm. Five of the devices (e.g., TV, refrigerator, thermostat, oven, and media center) have audio input interfaces, and two (e.g., light switch and alarm) do not. Five of the devices (e.g., TV, refrigerator, thermostat, media center, and alarm) have audio output interfaces, and two (e.g., light switch, and oven) do not. All five of the endpoint devices with voice input capabilities (e.g., TV, refrigerator, thermostat, oven, and media center) are registered with the digital assistant, and their names, device types, functions, network addresses, locations in the house, etc. are all specified in the input channel database 380. All five of the endpoint devices with output capabilities (e.g., TV, refrigerator, thermostat, media center, and alarm) are registered with the digital assistant and their names, device types, functions, network addresses, locations in the house, etc. are all specified in the output channel database 382. All seven devices are controllable remotely via encoded commands transmitted from the digital assistant over the network. All seven devices are registered with the digital assistant, and their names, functions, APIs, etc. are stored in the controlled device database 384.

In an example scenario, the user walks about the house and talks to the digital assistant over a period of time. First, the user is in the kitchen, and utters a first voice input (e.g. "Assistant, what is the weather like today?"). The first voice input is captured by three devices (e.g., refrigerator, oven, and TV) in the vicinity of the user at the time. Each of the three devices (e.g., refrigerator, oven, and TV) captures the first voice input, and transmits the first voice input to the I/O processing module of the digital assistant in substantially real-time. The copies or input streams of the first voice input as received from the three devices are of different audio qualities due to the equipment quality, ambient noise level, and distance from the user, etc. For example, the TV is the farthest from the user, and therefore the first voice input received from the TV has the lowest volume and the longest delay. The refrigerator is running which adds a humming background noise to the first voice input received from the refrigerator. The first voice input received from the oven has the highest volume and lowest noise, and is therefore of the best quality. In this particular case, the first voice input received from the oven is chosen to be the voice input that is sent to the speech-to-text processing module for automatic speech recognition, and the result is subsequently used for intent deduction. When the digital assistant determines the user's intent and generates the audio output (e.g., today's weather report), the digital assistant selects a single output endpoint device from multiple available output end devices that are identified to be in the vicinity of the user. In this case, there are only two output endpoint devices (e.g., TV and refrigerator) in the user's vicinity at the time, the digital assistant selects the refrigerator as the output endpoint device to output the weather information to the user due to the closer distance between the user and the refrigerator as compared to the distance between the user and the TV. If the user has moved during the time that the digital assistant is gathering the weather information, and the digital assistant determines that the user is now closer to the TV than the refrigerator, the digital assistant will send the weather information to the TV instead.

Continuing with the example above, after the user has walked past the TV and the TV has finished outputting weather information, the user utters a second voice input (e.g., "Thermostat set to energy-saving mode. And turn off the light."). The second voice input is captured by two devices that are in the vicinity of the user at the time that the second voice input is uttered by the user. The digital assistant receives the second voice input from the TV and the thermostat, but not the light switch because the light switch does not have an audio input interface. The digital assistant chooses the copy of the second voice input received from the thermostat to transmit to the speech-to-text processing module (e.g., due to higher audio quality and/or closer distance between the thermostat and the user) and uses the result for intent deduction. Once the digital assistant determines the user's intent, the digital assistant generates an audio output (e.g., "Current room temperature is 75 degrees. Setting room temperature to 78 degrees."), and generates encoded instructions for resetting the thermostat to 78 degrees. The digital assistant identifies the thermostat as the controlled device for the encoded instruction and sends the encoded instruction to the thermostat over the network. The digital assistant also selects the thermostat as the output endpoint device to provide the audio output to the user. The digital assistant further identifies a second intent, and generates the encoded instruction for turning off the light. The digital assistant identifies the light switch to be the controlled device for this additional actionable intent, and sends the encoded instruction to the light switch.

In the above example, the digital assistant dynamically selects the input source from multiple input channels, and dynamically selects the output destination based on user's location and other considerations (e.g., sound quality, energy efficiency, etc.). From the digital assistant's perspective, the same voice input may be received from multiple input endpoint devices, and the digital assistant has multiple available channels to choose from for sending to audio output. The device that captures the voice input, delivers the audio output, and the device the performs the requested machine operation, can all be different and can all change dynamically during a continuous exchange between the user and the digital assistant.

Figure 4B:
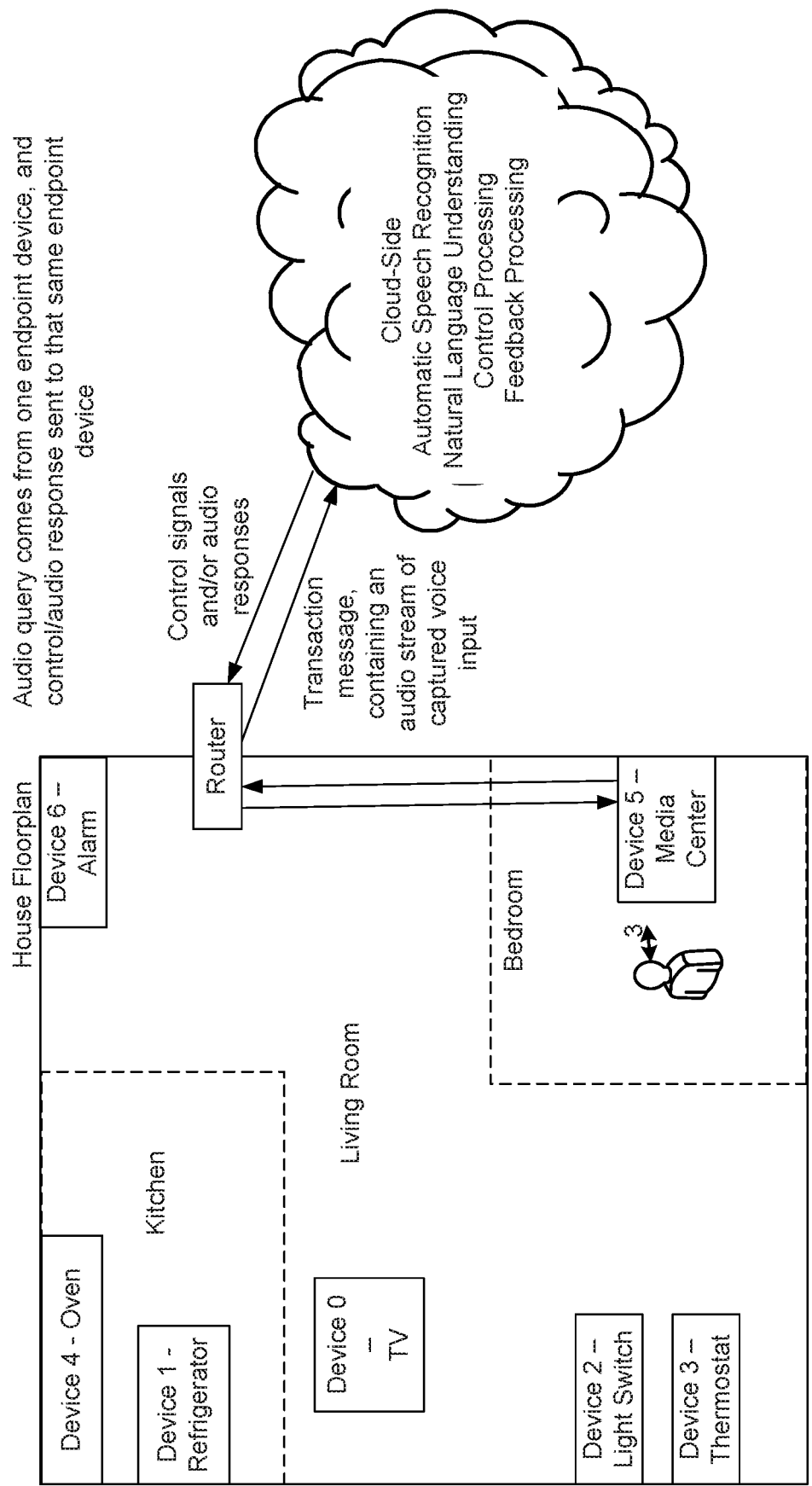

FIG. 4B illustrates that the user has now moved into the bedroom, and uttered a third voice input (e.g., "Turn on the radio.") The only input endpoint in the bedroom is the media center, and the media center captures the third voice input and sends it to the digital assistant. The digital assistant uses the third voice input to determine the user's intent and identifies the media center as the controlled device for the user's request. The digital assistant identifies the encoded machine instruction for turning on the radio and sends the encoded instruction to the media center.

Figure 4C:
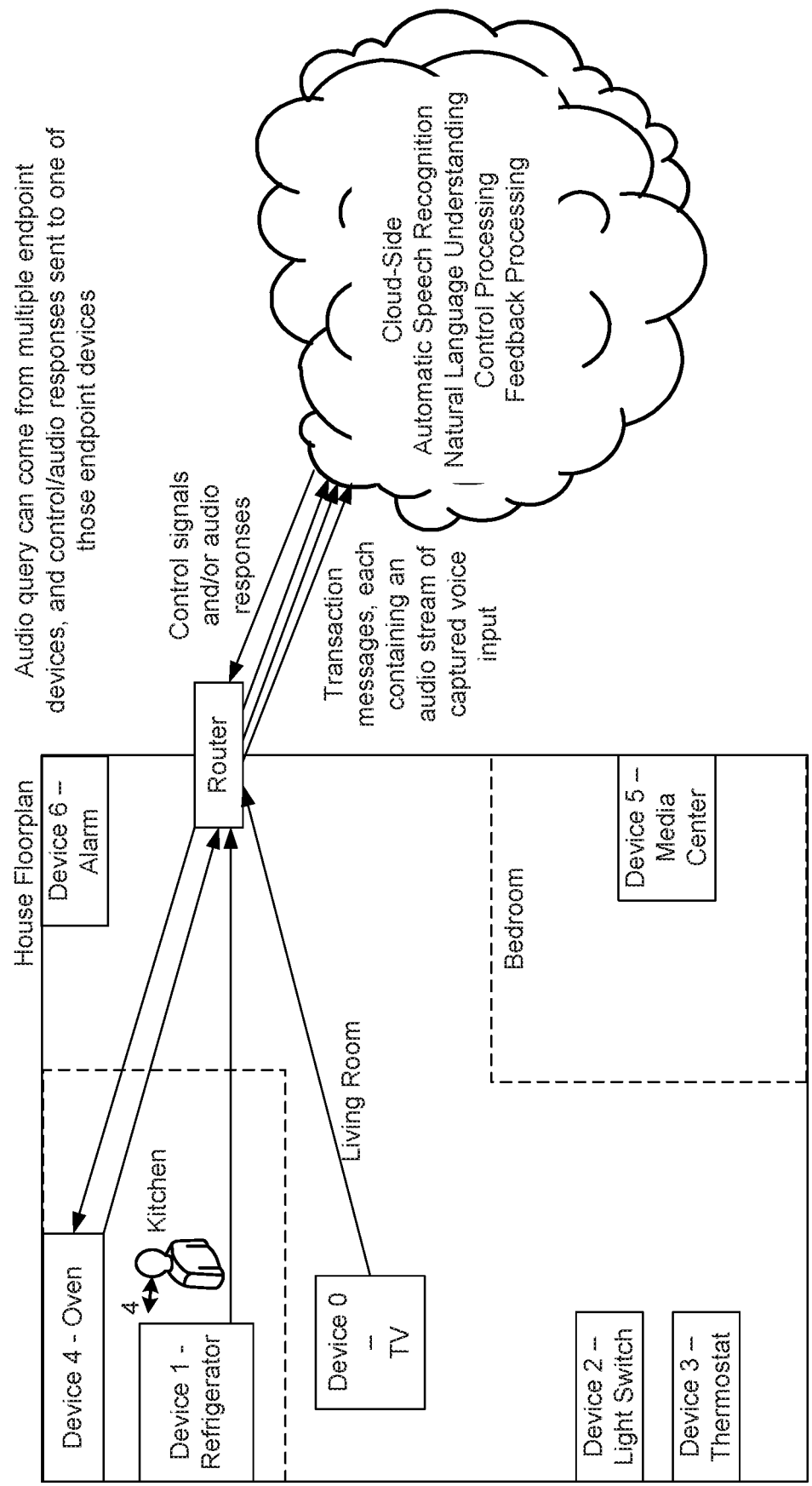

FIG. 4C illustrates the scenario where the user is back in the kitchen and uttered a fourth voice input (e.g., "Turn off the oven.") The fourth voice input is captured by the oven, the refrigerator, and the TV and transmitted to the digital assistant through all three input channels. The digital assistant uses the fourth voice input transmitted from the refrigerator for automatic speech recognition and intent deduction. The digital assistant then determines that the oven is the controlled device for this user request, and sends the encoded instruction corresponding to turning off the oven to the oven.

Figure 4D:
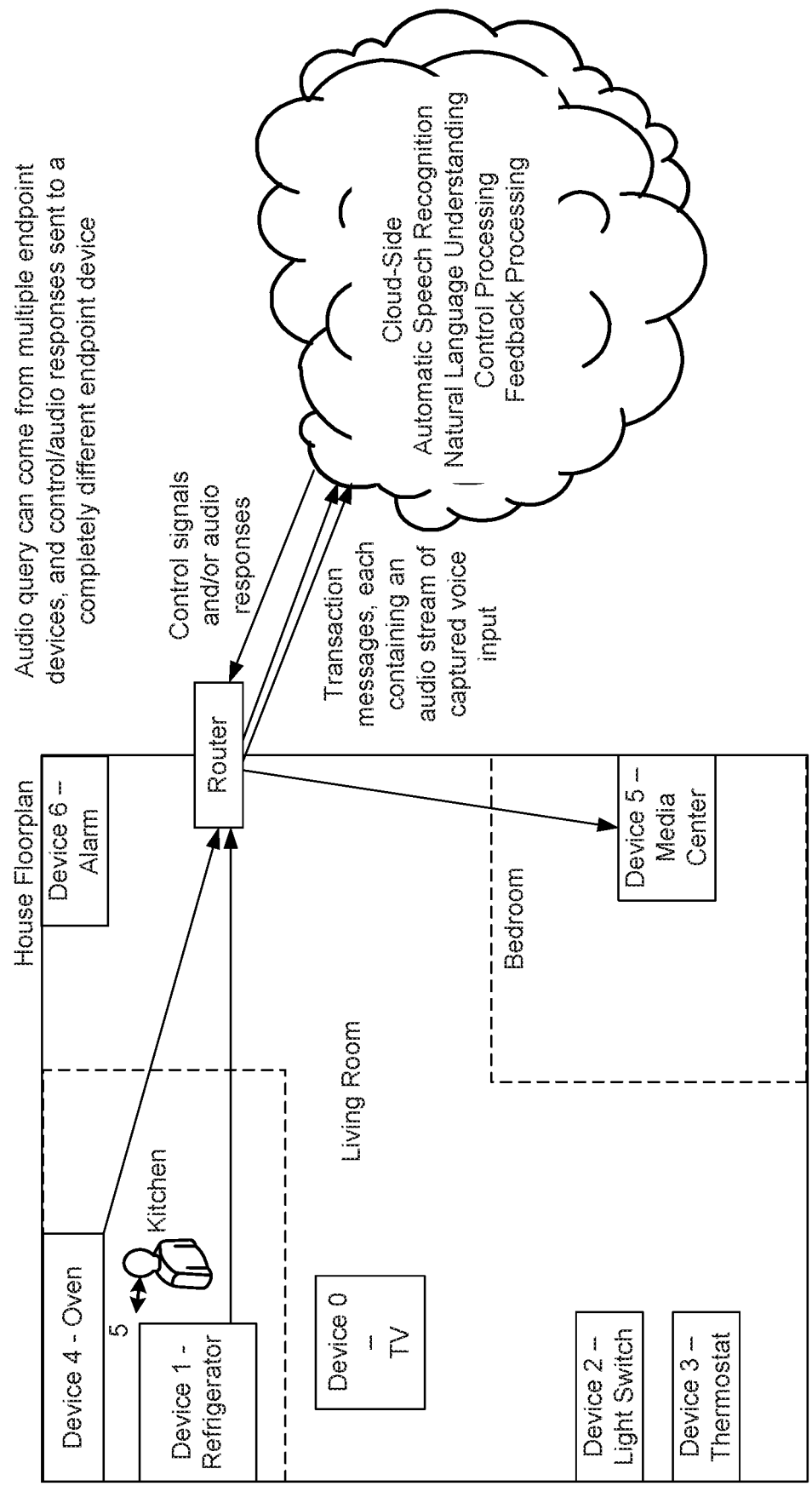

FIG. 4D illustrates an example scenario, where the user is still in the kitchen and uttered a fifth voice input (e.g., "Turn up the radio volume."). The fifth voice input is captured by both the refrigerator and the oven. The digital assistant receives the fifth voice input from both the refrigerator and the oven, and uses the fifth voice input received from the refrigerator as the input for automatic speech recognition and intent deduction. The TV did not capture the fifth voice input because the user had the refrigerator door open and prevented the user's voice from reaching the TV. The digital assistant determines the user's intent based on the analysis of the fifth voice input, and identifies the media center as the controlled device for this user request. The digital assistant generates the encoded machine instructions to turn up the radio volume and sends the instruction to the media center over the network.

In the above examples, there are four distinct types of devices that are controllable over the network: type 1 (e.g., light switch): no audio input interface, no audio output interface; type 2 (e.g., oven): audio input interface enabled, no audio output interface; type 3 (e.g., smart alarm): no audio input interface, audio output interface enabled; and type 4 (e.g., TV, media center, refrigerator, thermostat): audio input interface and audio output interface are both enabled. The smart alarm (device 6) was not used in the above examples). In an example scenario where a water kettle boils over on the oven while the user is near the alarm, the oven sends an alarm trigger event to the digital assistant server, the digital assistant optionally sends an audio alert (e.g., "Beep—, check oven please.") to the alarm and makes the alarm outputs the audio alert.

Figure 5:
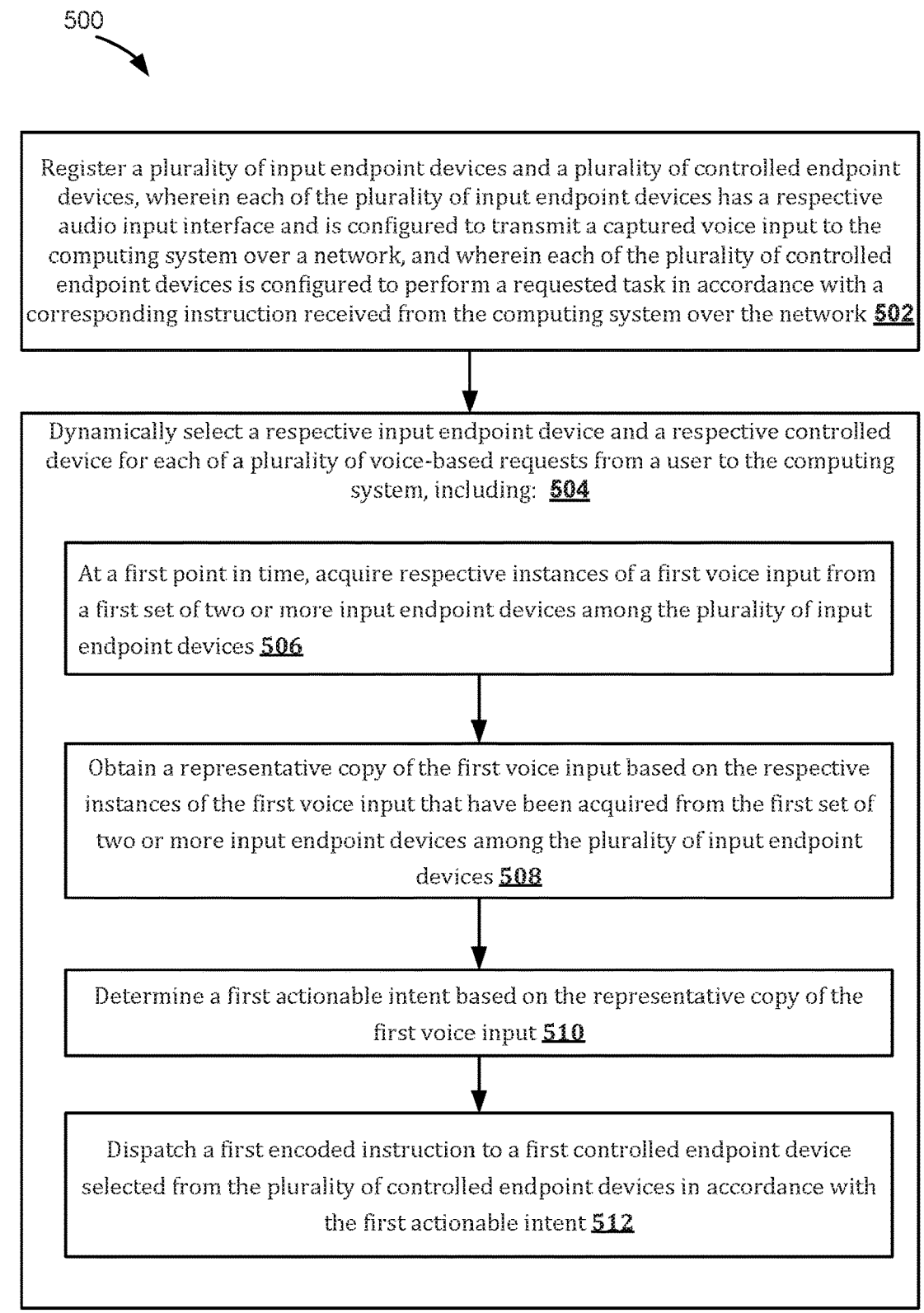
FIG. 5 is a flowchart illustrating methods for controlling a digital assistant with dynamically switchable endpoint devices, in accordance with some embodiments.

FIG. 5 is a flowchart for a method 500 of controlling a digital assistant with dynamically switchable endpoint devices. The method is performed at a computing system (e.g., digital assistant server 106 on server system 108') having one or more processors and memory. The method includes: registers (502) a plurality of input endpoint devices and a plurality of controlled endpoint devices, wherein each of the plurality of input endpoint devices has a respective audio input interface and is configured to transmit a captured voice input to the computing system over a network, and wherein each of the plurality of controlled endpoint devices is configured to perform a requested task in accordance with a corresponding instruction received from the computing system over the network; and dynamically selecting (504) a respective input endpoint device and a respective controlled device for each of a plurality of voice-based requests from a user to the computing system. Dynamically selecting a respective input endpoint device and a respective controlled device for each of a plurality of voice-based requests from a user to the computing system includes: at a first point in time, acquiring (506) respective instances of a first voice input (e.g., respective audio input streams containing the first voice input) from a first set of two or more input endpoint devices (e.g., TV and thermostat in examples shown in FIG. 4A) among the plurality of input endpoint devices; obtaining (508) a representative copy of the first voice input (e.g., selecting the best quality audio stream received from the thermostat) based on the respective instances of the first voice input that have been acquired from the first set of two or more input endpoint devices among the plurality of input endpoint devices; determining a first actionable intent based on the representative copy of the first voice input; and dispatching a first encoded instruction to a first controlled endpoint device (e.g., the light switch) selected from the plurality of controlled endpoint devices in accordance with the first actionable intent.

In some embodiments, the method further includes: registering a plurality of output endpoint devices, wherein each of the plurality of output endpoint devices has a respective audio output interface that is configured to output audio content received from the computing system over the network; and dynamically selecting a respective output endpoint device for each of the plurality of voice-based requests from the user to the computing system, including: dispatching a first audio output corresponding to the first actionable intent to a first output endpoint device (e.g., thermostat) selected from the plurality of output endpoint devices over the network, wherein the first output endpoint device outputs the first audio output.

In some embodiments, dynamically selecting a respective output endpoint device for each of the plurality of voice-based requests from the user to the computing system, further includes: at a second point in time, acquiring respective instances of a second voice input from a second set of two or more input endpoint devices (e.g., TV, oven, and refrigerator) among the plurality of input endpoint devices, wherein the second set of two or more input endpoint devices are distinct from the first set of two or more input endpoint devices; obtaining a representative copy of the second voice input (e.g., the best quality audio received from the oven) based on the respective instances of the second voice input that have been acquired from the second set of two or more input endpoint devices among the plurality of input endpoint devices; determining a second actionable intent based on the representative copy of the second voice input; and dispatching a second encoded instruction to the first controlled endpoint device (e.g., the light switch) selected from the plurality of controlled endpoint devices in accordance with the second actionable intent. In some embodiments, dynamically selecting a respective output endpoint device for each of the plurality of voice-based requests from the user to the computing system, further includes: dispatching a second audio output corresponding to the second actionable intent to a second output endpoint device (e.g., refrigerator) selected from the plurality of output endpoint devices over the network, wherein the second output endpoint device is distinct from the first output endpoint device, and wherein the second output endpoint device outputs the first audio output.

For example, the user can utter two different voice commands (e.g., "Turn on the light" and "Turn off the light") for controlling the same device (e.g., a light switch) located at two different locations. Based on the location of the user at the time that the first voice command is uttered, a first set of input endpoint devices (e.g., TV, thermostat) captured and transmitted the input audio streams containing the first voice command to the digital assistant. Based on the location of the user at the time that the second voice command is uttered, a second set of input endpoint devices (e.g., TV, oven, refrigerator) (different from the first set of input endpoint devices) captured and transmitted the input audio streams containing the second voice command to the digital assistant. Furthermore, depending on various criteria, the voice inputs from different input endpoint devices (e.g., first voice command received from the thermostat, and second voice command received from the oven) are chosen by the digital assistant for speech to text processing and intent deduction. Based on the actionable intents deduced from the two voice commands, the same controlled endpoint device (e.g., the light switch) are identified by the digital assistant, and corresponding machine instructions (e.g., for turning on, and turning off) are send to the same controlled endpoint device from the digital assistant over the network. A confirmation audio output can be send to different output endpoint devices as well based on the location of the user at the time that the output is to be provided to the user. For example, the audio response to the first voice command is sent to the thermostat, while the audio response to the second voice command is sent to the refrigerator.

In some embodiments, dynamically selecting a respective output endpoint device for each of the plurality of voice-based requests from the user to the computing system, further includes: at a third point in time, acquiring respective instances of a third voice input from the first set of two or more input endpoint devices among the plurality of input endpoint devices; obtaining a representative copy of the third voice input based on the respective instances of the third voice input that have been acquired from the first set of two or more input endpoint devices among the plurality of input endpoint devices; determining a third actionable intent based on the representative copy of the third voice input; and dispatching a third encoded instruction to a second controlled endpoint device selected from the plurality of controlled endpoint devices in accordance with the third actionable intent, wherein the second controlled endpoint device is distinct from the first controlled endpoint device.

For example, the user can stand at the same location and utter two different commands (e.g., "turn on the light" and "turn off the radio"), each for controlling a different device (e.g., light switch, and media center, respectively). The two voice commands are sent to the digital assistant by the same set of multiple input endpoint devices (e.g., TV and thermostat). The digital assistant may choose the first voice command received from the TV to process and choose the second voice command received from the thermostat to process, depending on the audio qualities of those inputs. For the first voice command, the digital assistant sends a command to the light switch. For the second voice command, the digital assistant sends a command to the media center.

In some embodiments, the plurality of input endpoint devices and the plurality of controlled endpoint devices include devices located in a respective smart home environment.

In some embodiments, the first set of two or more input endpoint device (e.g., TV, thermostat) includes the first controlled endpoint device (e.g., thermostat) and at least one device (e.g., TV) that is not among the plurality of controlled endpoint devices.

Figure 6:
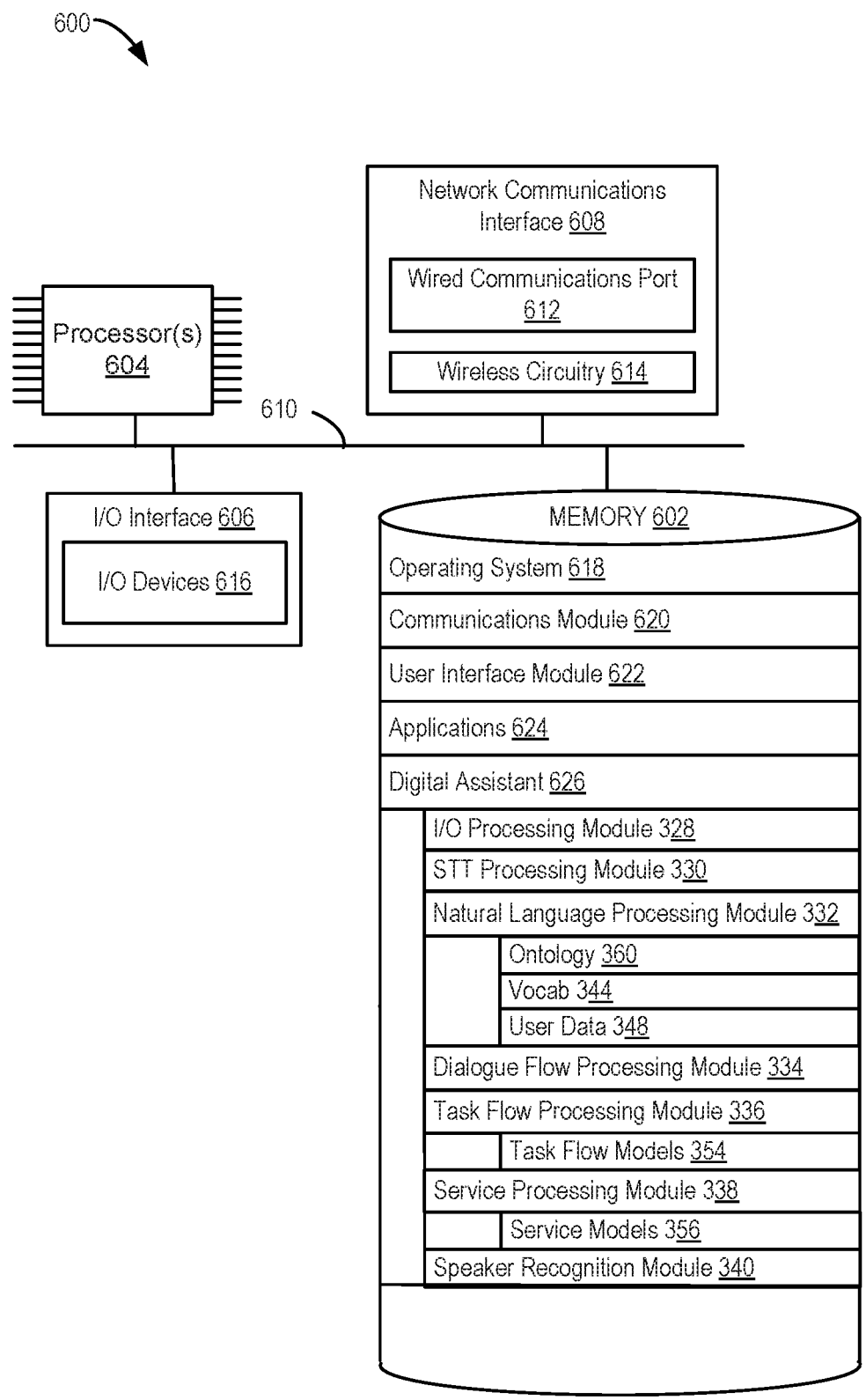
FIG. 6 is a block diagram illustrating a digital assistant system or a digital assistant server system in accordance with some embodiments.

FIG. 6 is a block diagram of an example digital assistant server 600 (e.g., the server device that implements the digital assistant server 106'). The digital assistant system 600 includes memory 602, one or more processors 604, one or more input/output (I/O) interfaces 606, and a network communications interface 608. These components communicate with one another over one or more communication buses or signal lines 610.

In some embodiments, memory 602 includes a non-transitory computer readable medium, such as high-speed random-access memory and/or a non-volatile computer readable storage medium (e.g., one or more magnetic disk storage devices, one or more flash memory devices, one or more optical storage devices, and/or other non-volatile solid-state memory devices).

The I/O interface 606 couples input/output devices, such as displays, keyboards, touch screens, speakers, and microphones, to the user interface module 622. The I/O interface 606, in conjunction with the user interface module 322, receives user inputs (e.g., voice input, keyboard inputs, touch inputs, etc.) and process them accordingly.

In some embodiments, the network communications interface 608 includes wired communication port(s) 612 and/or wireless transmission and reception circuitry 614. The wired communication port(s) receive and send communication signals via one or more wired interfaces, e.g., Ethernet, Universal Serial Bus (USB), FIREWIRE, etc. The wireless circuitry 614 typically receives and sends RF signals and/or optical signals from/to communications networks and other communications devices. The wireless communications may use any of a plurality of communications standards, protocols and technologies, such as GSM, EDGE, CDMA, TDMA, Bluetooth, Wi-Fi, VoIP, Wi-MAX, or any other suitable communication protocol. The network communications interface 608 enables communication between the digital assistant system 600 with networks, such as the Internet, an intranet and/or a wireless network, such as a cellular telephone network, a wireless local area network (LAN) and/or a metropolitan area network (MAN), and other devices.

In some embodiments, the I/O interfaces 606 and the network communication interface 608 together implement the multi-channel collection interface 360, the multi-channel output dispatch interface 378 and instruction dispatch interface 376 of the digital assistant as described with respect to FIG. 3B.

In some embodiments, the non-transitory computer readable storage medium of memory 602 stores programs, modules, instructions, and data structures including all or a subset of: an operating system 618, a communications module 620, a user interface module 622, one or more applications 624, and a digital assistant module 626. The one or more processors 604 execute these programs, modules, and instructions, and reads/writes from/to the data structures.

The operating system 618 (e.g., Android, Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

The communications module 620 facilitates communications between the digital assistant system 600 with other devices over the network communications interface 608. For example, the communication module 620 may communicate with the communications modules of the endpoint devices 144 shown in FIG. 1B. The communications module 620 also includes various software components for handling data received by the wireless circuitry 614 and/or wired communications port 612.

In some embodiments, the user interface module 622 receives commands and/or inputs from a user via the I/O interface 606 (e.g., from a keyboard, touch screen, and/or microphone), and provides user interface objects on a display.

The applications 624 include programs and/or modules that are configured to be executed by the one or more processors 604. The applications 624 may include user applications, such as home control center, games, a calendar application, a navigation application, or an email application, and/or resource management applications, diagnostic applications, or scheduling applications, for example.

Memory 602 also stores the digital assistant module (or the server portion of a digital assistant) 626. In some embodiments, the digital assistant module 626 includes the following sub-modules, or a subset or superset thereof: an input/output processing module 328, a speech-to-text (STT) processing module 330, a natural language processing module 332, a dialogue flow processing module 334, a task flow processing module 336, a service processing module 338, and a speaker recognition module 340. Each of these processing modules has access to one or more of the following data and models of the digital assistant 626, or a subset or superset thereof: ontology 360, vocabulary index 344, user data 348, task flow models 354, service models 356, speaker voice models 358.

In some embodiments, using the processing modules (e.g., the input/output processing module 328, the speaker recognition module 340, the STT processing module 330, the natural language processing module 332, the dialogue flow processing module 334, the task flow processing module 336, and/or the service processing module 338), data, and models implemented in the digital assistant module 326, the digital assistant system 600 performs at least some of the following: identifying a user's intent expressed in a natural language input received from the user; actively eliciting and obtaining information needed to fully deduce the user's intent (e.g., by disambiguating words, names, intentions, etc.); determining the task flow for fulfilling the deduced intent; and executing the task flow to fulfill the deduced intent. In some embodiments, the digital assistant also takes appropriate actions when a satisfactory response was not or could not be provided to the user for various reasons. In some embodiments, the memory includes a home control module that utilizes the APIs of the home control services to control different home appliances that are registered with the digital assistant system in accordance with user commands and user intent that are deduced from the user's voice inputs.

The foregoing description, for purpose of explanation, has been described with reference to specific embodiments. However, the illustrative discussions above are not intended to be exhaustive or to limit the disclosed embodiments to the precise forms disclosed. Many modifications and variations are possible in view of the above teachings. The embodiments were chosen and described in order to best explain the principles and practical applications of the disclosed ideas, to thereby enable others skilled in the art to best utilize them with various modifications as are suited to the particular use contemplated.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "upon a determination that" or "in response to determining" or "in accordance with a determination" or "upon detecting" or "in response to detecting" that the stated condition precedent is true, depending on the context.

What is claimed is:

1. A method of controlling a digital assistant with dynamically switchable endpoint devices, comprising:
   at a computing system having one or more processors and memory:
   registering a plurality of input endpoint devices and a plurality of controlled endpoint devices, wherein each of the plurality of input endpoint devices has a respective audio input interface and is configured to transmit a captured voice input to the computing system over a network, and wherein each of the plurality of controlled endpoint devices is configured to perform a requested task in accordance with a corresponding instruction received from the computing system over the network; and
   dynamically selecting a respective input endpoint device and a respective controlled device for each of a plurality of voice-based requests from a user to the computing system, including:
      at a first point in time, acquiring respective instances of a first voice input from a first set of two or more input endpoint devices among the plurality of input endpoint devices;
      obtaining a representative copy of the first voice input based on the respective instances of the first voice input that have been acquired from the first set of two or more input endpoint devices among the plurality of input endpoint devices, including:
         in accordance with a determination that two or more of the respective instances of the first voice input have quality above a preset threshold, selecting the representative copy of the first voice input from the two or more of the respective instances of the first voice input; and
         in accordance with a determination that all of the respective instances of the first voice input have quality below the preset threshold, generating the respective copy of the first voice input by integrating multiple instances of the respective instances of the first voice input according to a signal processing algorithm;
      determining a first actionable intent based on the representative copy of the first voice input; and
      dispatching a first encoded instruction to a first controlled endpoint device selected from the plurality of controlled endpoint devices in accordance with the first actionable intent.

2. The method of claim 1, including:
   registering a plurality of output endpoint devices, wherein each of the plurality of output endpoint devices has a respective audio output interface that is configured to output audio content received from the computing system over the network; and
   dynamically selecting a respective output endpoint device for each of the plurality of voice-based requests from the user to the computing system, including:
      dispatching a first audio output corresponding to the first actionable intent to a first output endpoint device selected from the plurality of output endpoint devices over the network, wherein the first output endpoint device outputs the first audio output.

3. The method of claim 2, wherein dynamically selecting a respective output endpoint device for each of the plurality of voice-based requests from the user to the computing system, further includes:
   at a second point in time, acquiring respective instances of a second voice input from a second set of two or more input endpoint devices among the plurality of input endpoint devices, wherein the second set of two or more input endpoint devices are distinct from the first set of two or more input endpoint devices;
   obtaining a representative copy of the second voice input based on the respective instances of the second voice input that have been acquired from the second set of two or more input endpoint devices among the plurality of input endpoint devices;
   determining a second actionable intent based on the representative copy of the second voice input; and
   dispatching a second encoded instruction to the first controlled endpoint device selected from the plurality of controlled endpoint devices in accordance with the second actionable intent.

4. The method of claim 3, wherein dynamically selecting a respective output endpoint device for each of the plurality of voice-based requests from the user to the computing system, further includes:
   dispatching a second audio output corresponding to the second actionable intent to a second output endpoint device selected from the plurality of output endpoint devices over the network, wherein the second output endpoint device is distinct from the first output endpoint device, and wherein the second output endpoint device outputs the first second audio output.

5. The method of claim 2, wherein dynamically selecting a respective output endpoint device for each of the plurality of voice-based requests from the user to the computing system, further includes:
   at a third point in time, acquiring respective instances of a third voice input from the first set of two or more input endpoint devices among the plurality of input endpoint devices;
   obtaining a representative copy of the third voice input based on the respective instances of the third voice input that have been acquired from the first set of two or more input endpoint devices among the plurality of input endpoint devices;

determining a third actionable intent based on the representative copy of the third voice input; and dispatching a third encoded instruction to a second controlled endpoint device selected from the plurality of controlled endpoint devices in accordance with the third actionable intent, wherein the second controlled endpoint device is distinct from the first controlled endpoint device.

6. The method of claim 1, wherein the plurality of input endpoint devices and the plurality of controlled endpoint devices include devices located in a respective smart home environment.

7. The method of claim 1, wherein the first set of two or more input endpoint devices includes the first controlled endpoint device and at least one device that is not among the plurality of controlled endpoint devices.

8. A computing system, comprising:
one or more processors; and
memory storing instructions, the instructions, when executed by the one or more processors, cause the processors to perform operations comprising:
registering a plurality of input endpoint devices and a plurality of controlled endpoint devices, wherein each of the plurality of input endpoint devices has a respective audio input interface and is configured to transmit a captured voice input to the computing system over a network, and wherein each of the plurality of controlled endpoint devices is configured to perform a requested task in accordance with a corresponding instruction received from the computing system over the network; and
dynamically selecting a respective input endpoint device and a respective controlled device for each of a plurality of voice-based requests from a user to the computing system, including:
at a first point in time, acquiring respective instances of a first voice input from a first set of two or more input endpoint devices among the plurality of input endpoint devices;
obtaining a representative copy of the first voice input based on the respective instances of the first voice input that have been acquired from the first set of two or more input endpoint devices among the plurality of input endpoint devices;
in accordance with a determination that two or more of the respective instances of the first voice input have quality above a preset threshold, selecting the representative copy of the first voice input from the two or more of the respective instances of the first voice input; and
in accordance with a determination that all of the respective instances of the first voice input have quality below the preset threshold, generating the respective copy of the first voice input by integrating multiple instances of the respective instances of the first voice input according to a signal processing algorithm;
determining a first actionable intent based on the representative copy of the first voice input; and
dispatching a first encoded instruction to a first controlled endpoint device selected from the plurality of controlled endpoint devices in accordance with the first actionable intent.

9. The computing system of claim 8, wherein the operations include:
registering a plurality of output endpoint devices, wherein each of the plurality of output endpoint devices has a respective audio output interface that is configured to output audio content received from the computing system over the network; and
dynamically selecting a respective output endpoint device for each of the plurality of voice-based requests from the user to the computing system, including:
dispatching a first audio output corresponding to the first actionable intent to a first output endpoint device selected from the plurality of output endpoint devices over the network, wherein the first output endpoint device outputs the first audio output.

10. The computing system of claim 9, wherein dynamically selecting a respective output endpoint device for each of the plurality of voice-based requests from the user to the computing system, further includes:
at a second point in time, acquiring respective instances of a second voice input from a second set of two or more input endpoint devices among the plurality of input endpoint devices, wherein the second set of two or more input endpoint devices are distinct from the first set of two or more input endpoint devices;
obtaining a representative copy of the second voice input based on the respective instances of the second voice input that have been acquired from the second set of two or more input endpoint devices among the plurality of input endpoint devices;
determining a second actionable intent based on the representative copy of the second voice input; and
dispatching a second encoded instruction to the first controlled endpoint device selected from the plurality of controlled endpoint devices in accordance with the second actionable intent.

11. The computing system of claim 10, wherein dynamically selecting a respective output endpoint device for each of the plurality of voice-based requests from the user to the computing system, further includes:
dispatching a second audio output corresponding to the second actionable intent to a second output endpoint device selected from the plurality of output endpoint devices over the network, wherein the second output endpoint device is distinct from the first output endpoint device, and wherein the second output endpoint device outputs the first second audio output.

12. The computing system of claim 9, wherein dynamically selecting a respective output endpoint device for each of the plurality of voice-based requests from the user to the computing system, further includes:
at a third point in time, acquiring respective instances of a third voice input from the first set of two or more input endpoint devices among the plurality of input endpoint devices;
obtaining a representative copy of the third voice input based on the respective instances of the third voice input that have been acquired from the first set of two or more input endpoint devices among the plurality of input endpoint devices;
determining a third actionable intent based on the representative copy of the third voice input; and
dispatching a third encoded instruction to a second controlled endpoint device selected from the plurality of controlled endpoint devices in accordance with the third actionable intent, wherein the second controlled endpoint device is distinct from the first controlled endpoint device.

13. The computing system of claim 8, wherein the plurality of input endpoint devices and the plurality of controlled endpoint devices include devices located in a respective smart home environment.

14. The computing system of claim 8, wherein the first set of two or more input endpoint devices includes the first controlled endpoint device and at least one device that is not among the plurality of controlled endpoint devices.

15. A non-transitory computer-readable storage medium storing instructions, the instructions, when executed by one or more processors, cause the processors to perform operations comprising:
registering a plurality of input endpoint devices and a plurality of controlled endpoint devices, wherein each of the plurality of input endpoint devices has a respective audio input interface and is configured to transmit a captured voice input to a computing system over a network, and wherein each of the plurality of controlled endpoint devices is configured to perform a requested task in accordance with a corresponding instruction received from the computing system over the network; and
dynamically selecting a respective input endpoint device and a respective controlled device for each of a plurality of voice-based requests from a user to the computing system, including:
at a first point in time, acquiring respective instances of a first voice input from a first set of two or more input endpoint devices among the plurality of input endpoint devices;
obtaining a representative copy of the first voice input based on the respective instances of the first voice input that have been acquired from the first set of two or more input endpoint devices among the plurality of input endpoint devices;
in accordance with a determination that two or more of the respective instances of the first voice input have quality above a preset threshold, selecting the representative copy of the first voice input from the two or more of the respective instances of the first voice input; and
in accordance with a determination that all of the respective instances of the first voice input have quality below the preset threshold, generating the respective copy of the first voice input by integrating multiple instances of the respective instances of the first voice input according to a signal processing algorithm;
determining a first actionable intent based on the representative copy of the first voice input; and
dispatching a first encoded instruction to a first controlled endpoint device selected from the plurality of controlled endpoint devices in accordance with the first actionable intent.

16. The computer-readable storage medium of claim 15, wherein the operations include:
registering a plurality of output endpoint devices, wherein each of the plurality of output endpoint devices has a respective audio output interface that is configured to output audio content received from the computing system over the network; and
dynamically selecting a respective output endpoint device for each of the plurality of voice-based requests from the user to the computing system, including:
dispatching a first audio output corresponding to the first actionable intent to a first output endpoint device selected from the plurality of output endpoint devices over the network, wherein the first output endpoint device outputs the first audio output.

17. The computer-readable storage medium of claim 16, wherein dynamically selecting a respective output endpoint device for each of the plurality of voice-based requests from the user to the computing system, further includes:
at a second point in time, acquiring respective instances of a second voice input from a second set of two or more input endpoint devices among the plurality of input endpoint devices, wherein the second set of two or more input endpoint devices are distinct from the first set of two or more input endpoint devices;
obtaining a representative copy of the second voice input based on the respective instances of the second voice input that have been acquired from the second set of two or more input endpoint devices among the plurality of input endpoint devices;
determining a second actionable intent based on the representative copy of the second voice input; and
dispatching a second encoded instruction to the first controlled endpoint device selected from the plurality of controlled endpoint devices in accordance with the second actionable intent.

18. The computer-readable storage medium of claim 17, wherein dynamically selecting a respective output endpoint device for each of the plurality of voice-based requests from the user to the computing system, further includes:
dispatching a second audio output corresponding to the second actionable intent to a second output endpoint device selected from the plurality of output endpoint devices over the network, wherein the second output endpoint device is distinct from the first output endpoint device, and wherein the second output endpoint device outputs the second audio output.

19. The computer-readable storage medium of claim 16, wherein dynamically selecting a respective output endpoint device for each of the plurality of voice-based requests from the user to the computing system, further includes:
at a third point in time, acquiring respective instances of a third voice input from the first set of two or more input endpoint devices among the plurality of input endpoint devices;
obtaining a representative copy of the third voice input based on the respective instances of the third voice input that have been acquired from the first set of two or more input endpoint devices among the plurality of input endpoint devices;
determining a third actionable intent based on the representative copy of the third voice input; and
dispatching a third encoded instruction to a second controlled endpoint device selected from the plurality of controlled endpoint devices in accordance with the third actionable intent, wherein the second controlled endpoint device is distinct from the first controlled endpoint device.

20. The computer-readable storage medium of claim 15, wherein the plurality of input endpoint devices and the plurality of controlled endpoint devices include devices located in a respective smart home environment.

* * * * *